US012656321B2

(12) United States Patent
Na et al.

(10) Patent No.: US 12,656,321 B2
(45) Date of Patent: Jun. 16, 2026

(54) ULTRASOUND DEVICE AND METHOD FOR SELF-INSPECTION THEREOF

(71) Applicant: SAMSUNG MEDISON CO., LTD., Hongcheon-gun (KR)

(72) Inventors: Min Soo Na, Hongcheon-Gun (KR); Yong Cheol Hyeon, Hongcheon-Gun (KR)

(73) Assignee: SAMSUNG MEDISON CO., LTD., Hongcheon-Gun (KR)

( * ) Notice: Subject to any disclaimer, the term of this patent is extended or adjusted under 35 U.S.C. 154(b) by 353 days.

(21) Appl. No.: 18/222,669

(22) Filed: Jul. 17, 2023

(65) Prior Publication Data

US 2024/0241085 A1 Jul. 18, 2024

(30) Foreign Application Priority Data

Jan. 16, 2023 (KR) ........................ 10-2023-0006377

(51) Int. Cl.
*G01N 29/30* (2006.01)

(52) U.S. Cl.
CPC .................................... *G01N 29/30* (2013.01)

(58) Field of Classification Search
CPC .. G01N 29/30; A61B 8/56; A61B 8/58; A61B 8/4444; G01S 7/5205
See application file for complete search history.

(56) References Cited

U.S. PATENT DOCUMENTS

| | | | |
|---|---|---|---|
| 7,843,764 B2 | 11/2010 | Hongon | |
| 8,230,741 B2 | 7/2012 | Suita et al. | |

| | | | | |
|---|---|---|---|---|
| 10,509,014 B2 * | 12/2019 | Segall | ................... | G01N 29/262 |
| 11,564,665 B2 | 1/2023 | Yazaki et al. | | |
| 2004/0211240 A1 * | 10/2004 | Gessert | ................ | A61B 8/4444 367/13 |
| 2006/0061231 A1 | 3/2006 | Kameishi | | |
| 2009/0299183 A1 | 12/2009 | Kozai | | |

(Continued)

FOREIGN PATENT DOCUMENTS

| | | |
|---|---|---|
| JP | 3273547 B2 | 4/2002 |
| JP | 2008-289697 A | 4/2008 |

(Continued)

OTHER PUBLICATIONS

J. Kim, et al., "Electrical Modeling of Piezoelectric Ceramics for Analysis and Evaluation of Sensory Systems," IEEE Sensors Applications Symposium, Feb. 12-14, 2008.

(Continued)

*Primary Examiner* — Xin Y Zhong
(74) *Attorney, Agent, or Firm* — Morgan Lewis & Bockius LLP

(57) ABSTRACT

Provided is an ultrasound device comprising, ultrasonic probes, a transceiver configured to deliver transmission signals to the ultrasonic probes and receive reception signals from the ultrasonic probes, channels configured to deliver the transmission signals and the reception signals, a relay unit configured to select a target ultrasonic probe connected to the channels among the ultrasonic probes, a controller configured to generate a test input signal and a selection signal, and a signal output unit configured to select a target channel among the channels based on the selection signal and output the test input signal to the target channel.

15 Claims, 20 Drawing Sheets

(56)     References Cited

U.S. PATENT DOCUMENTS

| | | |
|---|---|---|
| 2019/0129021 A1 | 5/2019 | Heyon |
| 2021/0353258 A1 | 11/2021 | Tezuka et al. |

FOREIGN PATENT DOCUMENTS

| | | |
|---|---|---|
| JP | 2009-039246 A | 2/2009 |
| JP | 4266712 B2 | 5/2009 |
| JP | 2009-285175 A | 12/2009 |
| JP | 4546759 B2 | 9/2010 |
| JP | 2010-268852 A | 12/2010 |
| JP | 2011-115352 A | 6/2011 |
| JP | 2011-229630 A | 11/2011 |
| JP | 10-1438391 B1 | 9/2014 |
| JP | 2017-047083 A | 3/2017 |
| JP | 6234788 B2 | 11/2017 |
| JP | 6353386 B2 | 7/2018 |
| JP | 2021-178112 A | 11/2021 |
| KR | 10-1438391 B1 | 9/2014 |
| KR | 10-2019-0049378 A | 5/2019 |
| WO | 2014/092472 A1 | 6/2014 |

OTHER PUBLICATIONS

Extended European Search Report dated Sep. 15, 2023 issued in European Patent Application No. 23170313.3.
Notice of Allowance dated Aug. 25, 2025 issued in the corresponding European Patent Application No. 23170313.3. (Note: US 2004/211240 A1, JP 2009-039246 A, and JP 2008-289697 A already submitted.).

\* cited by examiner

ULTRASOUND DEVICE AND METHOD FOR SELF-INSPECTION THEREOF

CROSS-REFERENCE TO RELATED APPLICATION

The present application claims priority under 35 U.S.C. § 119(a) to Korean patent application number 10-2023-0006377 filed on Jan. 16, 2023, in the Korean Intellectual Property Office, the entire disclosure of which is incorporated by reference herein.

BACKGROUND

1. Technical Field

The present disclosure relates to an ultrasound device and a self-inspection method thereof.

2. Related Art

An ultrasound device is a device that irradiates an ultrasonic signal generated from a transducer of an ultrasonic probe from the body surface of an object toward a target part in the body, and obtains an image of an internal part of the object by receiving information of an ultrasound echo signal reflected from the object.

Ultrasound devices are widely used in the field of medical diagnosis since they are more stable than X-ray imaging devices because they do not have exposure to radiation, are able to display images in real time, and are cheaper and more portable than magnetic resonance imaging devices.

SUMMARY

Embodiments provide an ultrasound device capable of self-inspection of an ultrasonic probe and a self-inspection method thereof.

In accordance with an aspect of the present disclosure, there is provided an ultrasound device including: ultrasonic probes; a transceiver configured to deliver transmission signals to the ultrasonic probes and receive reception signals from the ultrasonic probes; channels configured to deliver the transmission signals and the reception signals; a relay unit configured to select a target ultrasonic probe connected to the channels among the ultrasonic probes; a controller configured to generate a test input signal and a selection signal; and a signal output unit configured to select a target channel among the channels based on the selection signal and output the test input signal to the target channel.

The ultrasound device may further include resistance elements connected between the signal output unit and the channels.

The ultrasound device may further include an analog-to-digital converter configured to analog-to-digital convert a test output signal generated by reflection of the test input signal from the target ultrasonic probe.

The controller may be configured to calculate a capacitance of the target ultrasonic probe based on the test output signal, and detect whether the target channel is defective based on the calculated capacitance.

In accordance with an aspect of the present disclosure, there is provided an ultrasound device including: a transceiver connected to channels configured to deliver transmission signals and reception signals; a controller configured to generate a test signal, a control signal, and a first selection signal; a relay unit including ports, and configured to connect some of the ports and the channels based on the control signal; signal distributors connected to the ports, respectively, and configured to distribute the test signal into distribution signals; and a first signal output unit configured to select one signal distributor among the signal distributors based on the first selection signal, and output the test signal to the one signal distributor, wherein the distribution signals are delivered to target ports connected to the one signal distributor.

The signal distributors may include a number of distribution resistance elements obtained by multiplying the number of the ports by the number of the channels.

When the control signal is a first control signal, the relay unit may connect the target ports and the channels based on the first control signal.

The controller may be configured to further generate a second selection signal, the ultrasound device may further include a second signal output unit configured to selectively output the distribution signals based on the second selection signal; and an analog-to-digital converter configured to analog-to-digital convert the selectively output distribution signals, and the controller may be configured to inspect connection states of the target ports based on the distribution signals.

When the control signal is a second control signal, the relay unit may connect the channels with ports different from the target ports among the ports based on the second control signal.

The controller may be configured to further generate a second selection signal, the ultrasound device may further include a second signal output unit configured to selectively output leakage signals generated from the target ports based on the second selection signal; and an analog-to-digital converter configured to analog-to-digital convert the selectively output leakage signals, and the controller may be configured to inspect leakage states of the target ports based on the leakage signals.

In accordance with an aspect of the present disclosure, there is provided a self-inspection method of an ultrasound device including: selecting a target ultrasonic probe connected to channels configured to deliver transmission signals and reception signals among ultrasonic probes; selecting a target channel among the channels based on a selection signal; outputting a test input signal to the target channel; analog-to-digital converting a test output signal generated by reflection of the test input signal from the target ultrasonic probe; and calculating a capacitance of the target ultrasonic probe based on the test output signal.

The self-inspection method may further include detecting whether the target channel is defective based on the calculated capacitance.

The detecting may include comparing the capacitance with an initial capacitance of the target ultrasonic probe.

In accordance with an aspect of the present disclosure, there is provided a self-inspection method of an ultrasound device including: delivering distribution signals into which a test signal is distributed to target ports among ports included in relays based on a first selection signal; connecting channels configured to deliver transmission signals and reception signals with the target ports based on a control signal; selectively outputting the distribution signals based on a second selection signal; analog-to-digital converting the selectively output distribution signals; and inspecting connection states of the target ports based on the distribution signals.

In accordance with an aspect of the present disclosure, there is provided a self-inspection method of an ultrasound device including: delivering distribution signals into which a test signal is distributed to target ports among ports included in relays based on a first selection signal; connecting channels configured to deliver transmission signals and reception signals with ports different from the target ports among the ports based on a control signal; selectively outputting leakage signals generated from the target ports based on a second selection signal; analog-to-digital converting the selectively output leakage signals; and inspecting leakage states of the target ports based on the leakage signals.

According to an ultrasound device and a self-inspection method thereof according to the present disclosure, it is possible to conveniently and efficiently check whether there is an abnormality of an ultrasonic probe through self-inspection.

However, the effects of the present disclosure are not limited to the above-described effects, and may be variously extended within a range that does not deviate from the spirit and scope of the present invention.

BRIEF DESCRIPTION OF THE DRAWINGS

The above and other features of the disclosure will become more apparent by describing in further detail embodiments thereof with reference to the accompanying drawings, in which.

DETAILED DESCRIPTION

The present specification clarifies the scope of the present disclosure and, to enable those of ordinary skill in the art to which the present disclosure pertains to practice the present disclosure, the principle of the present disclosure is explained and embodiments are disclosed. The disclosed embodiments may be implemented in various forms.

Further, although terms including ordinal numbers such as "first," "second," and the like are used to explain various components, the components are not limited to such terms and these terms are used only to distinguish one component from another component. For example, a first component may be referred to as a second component, or similarly, the second component may be referred to as the first component within the scope of the present disclosure.

In addition, terms used herein are used to describe the embodiments, not intended to limit and/or restrict the disclosed invention. The singular expression includes the plural expression unless the context clearly dictates otherwise. In the present specification, terms such as "comprise" or "have" specify the presence of stated features, integers, steps, operations, elements, components or a combination thereof, but do not preclude the presence or addition of one or more other features, integers, steps, operations, elements, components, a combination thereof.

Throughout the specification, when a part is "connected" to another part, it includes not only a case of being directly connected but also a case of being indirectly connected, and the indirect connection includes connection through a wireless communication network.

Hereinafter, embodiments according to the present disclosure will be described in detail with reference to the accompanying drawings.

Figure 1:
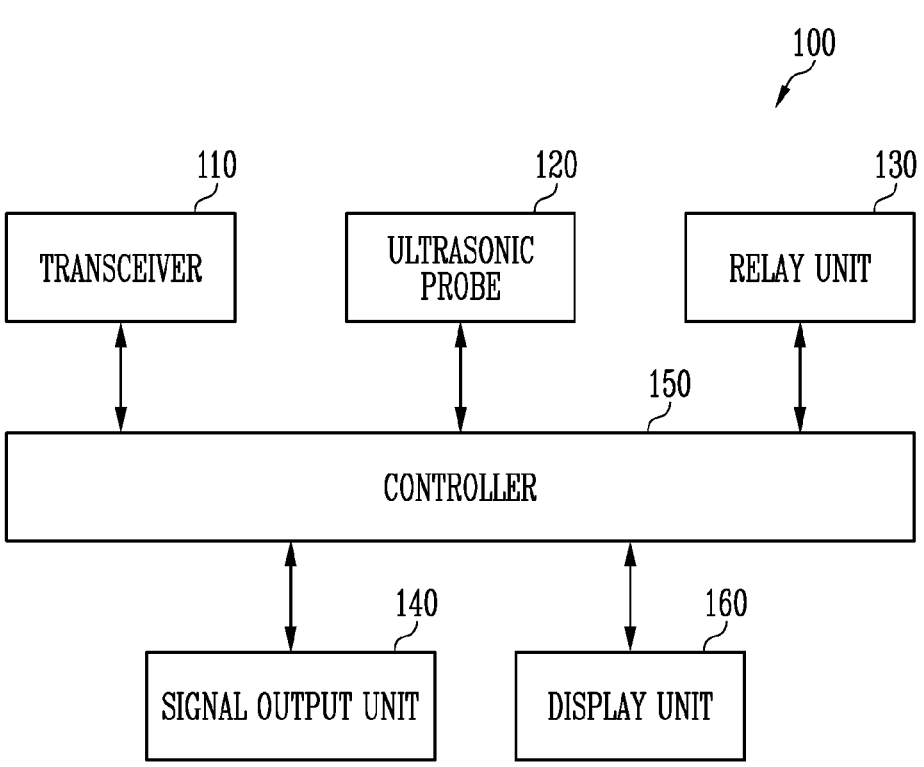
FIG. 1 is a block diagram of an ultrasound device in accordance with an embodiment of the present disclosure.
Figure 2:
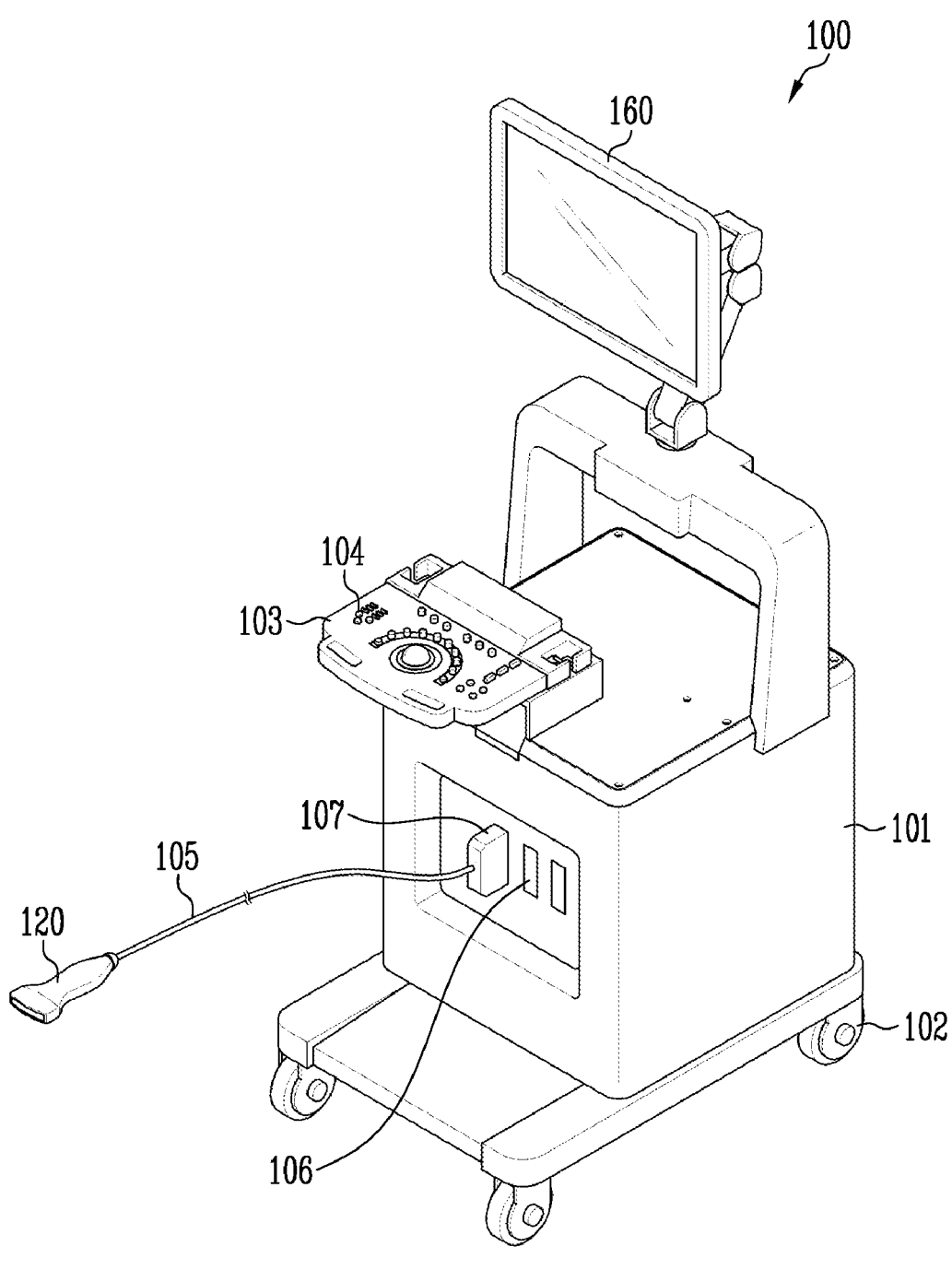
FIG. 2 is a perspective view of an ultrasound device in accordance with an embodiment of the present disclosure.
Figure 3:
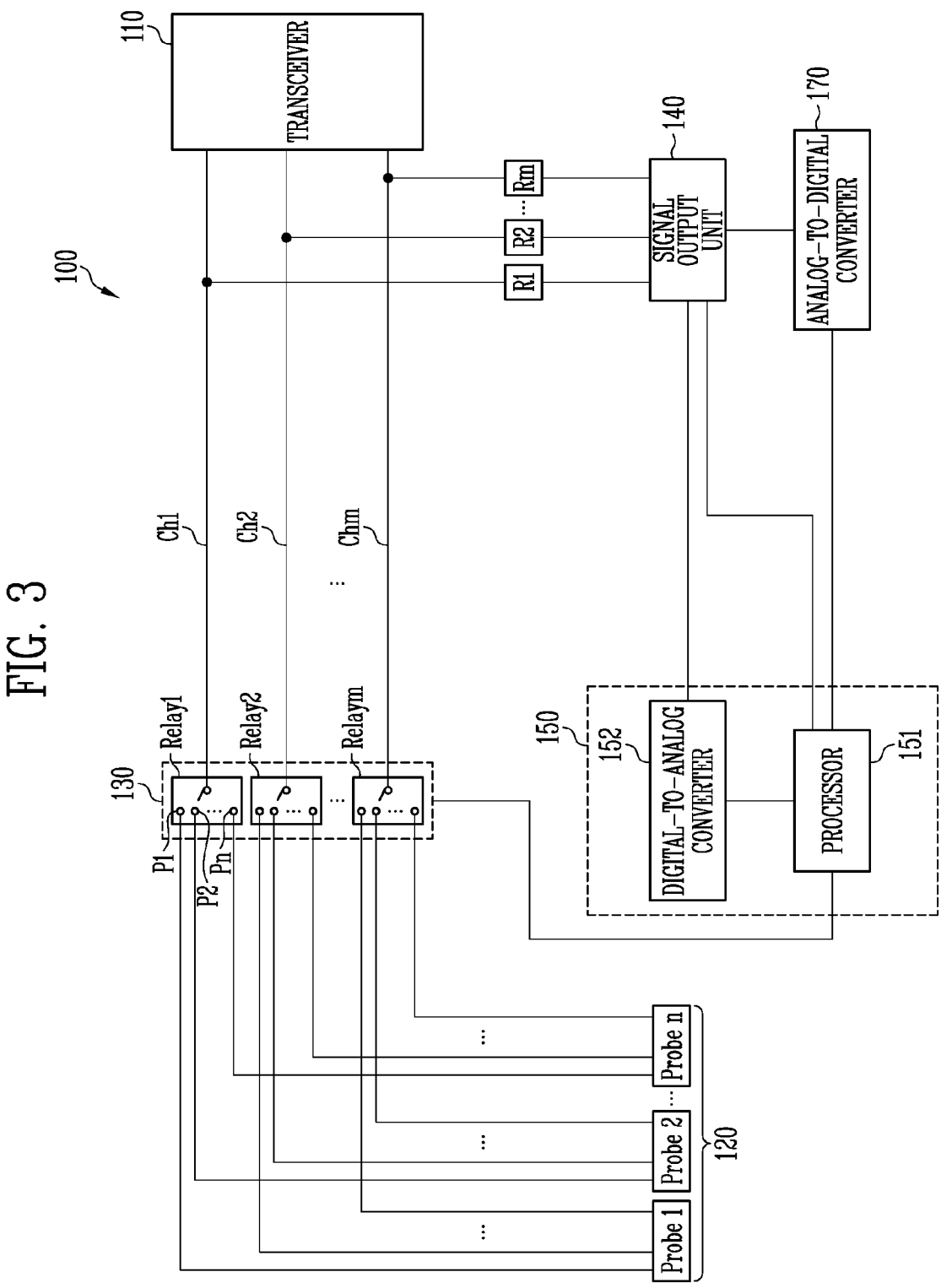
FIG. 3 is a circuit diagram of an ultrasound device in accordance with an embodiment of the present disclosure.

FIG. 1 is a block diagram of an ultrasound device in accordance with an embodiment of the present disclosure. FIG. 2 is a perspective view of an ultrasound device in accordance with an embodiment of the present disclosure. FIG. 3 is a circuit diagram of an ultrasound device in accordance with an embodiment of the present disclosure.

Referring to FIGS. 1 to 3, an ultrasound device 100 according to an embodiment of the present disclosure may include a transceiver 110, an ultrasonic probe 120, a relay unit 130, a signal output unit 140, a controller 150, and a display unit 160.

The transceiver 110 may output a transmission signal converted into an ultrasonic signal from the ultrasonic probe 120 and receive a reception signal output from the ultrasonic probe 120. The transceiver 110 may include a transmitter and a receiver.

The transmitter may output a transmission signal for obtaining a frame of an ultrasonic image. The transmission signal output by the transmitter may correspond to an electrical signal. The frame of the ultrasonic image may include a frame such as an A-mode (amplitude mode), a B-mode (brightness mode), a C-mode (color mode), a D-mode (doppler mode), an E-mode (elastography mode), an M-mode (motion mode), and an elastic image. The transmitter may output a transmission signal according to the control signal of the controller 150.

The transmitter may output transmission signals by embedding channels. For example, the transmitter may be provided with channels Ch1, Ch2, . . . , Chm connected to each of transducers on the ultrasonic probe 120, and transmit a transmission signal to each of the transducers through each of the channels Ch1, Ch2, . . . , Chm. Here, m may be a natural number of 3 or more.

The receiver may detect an ultrasonic image by receiving a reception signal output from the ultrasonic probe 120. For example, the receiver may include an amplifier for amplifying a reception signal, an analog-to-digital converter (ADC) for converting the reception signal into a digital signal, and a digital signal processor. The receiver may detect an ultrasonic image by amplifying the reception signal and converting into a digital signal and processing it. In other words, the receiver may convert the reception signals received through the channels Ch1, Ch2, . . . , Chm into digital signals, receive and focus the digitally converted reception signals, and detect ultrasonic images by using the reception-focused reception signals.

The ultrasonic probe 120 may contact the body surface of the object or be inserted into the body of the object to transmit and receive ultrasound. For example, the ultrasonic probe 120 may convert the transmission signal into an ultrasonic signal according to the transmission signal provided from the transmission unit, transmit the ultrasonic wave into the object, receive an ultrasonic echo signal reflected from a specific part inside the object, convert the ultrasonic echo signal into a reception signal that is an electrical signal, and transmit to the receiver.

The ultrasonic probe 120 may include transducers and a MUX circuit. The transducers may include elements capable of vibrating to convert an electrical signal into an ultrasonic wave, or an ultrasonic wave into an electrical signal. The elements may be arranged on one side of the housing of the ultrasonic probe. For example, the transducers may be arranged in a direction parallel to the opening so that transmission and reception of ultrasonic wave may be achieved through the opening provided on one side of the housing. In other words, the ultrasonic probe 120 may convert the transmission signal into an ultrasonic signal or convert an ultrasonic echo signal into a reception signal using the transducers.

The transducers may be implemented as piezoelectric ultrasonic transducers using a piezoelectric effect. The transducers may include piezoelectric materials or piezoelectric thin films. For example, when an alternating current from an internal storage device such as a battery or an external power supply is applied to a piezoelectric material or a piezoelectric thin film, the piezoelectric material or the piezoelectric thin film vibrates at a predetermined frequency, and ultrasonic waves of a predetermined frequency may be generated according to the vibration frequency. Conversely, when the ultrasonic echo signal of a predetermined frequency reaches a piezoelectric material or a piezoelectric thin film, the piezoelectric material or the piezoelectric thin film vibrates according to the frequency of the reached echo ultrasonic wave, and the piezoelectric material or the piezoelectric thin film may output an alternating current having a frequency corresponding to the vibration frequency. However, it is not limited thereto, and the transducers may be implemented as a magnetostrictive ultrasonic transducer that uses the magnetostrictive effect of a magnetic material, a capacitive micromachined ultrasonic transducer (cMUT) that transmits and receives ultrasonic waves using vibrations of hundreds or thousands of micromachined thin films, or the like.

Each of the transducers may be connected to each of the channels Ch1, Ch2, . . . , Chm of the transmitter to receive a transmission signal output by the transmitter. Each of the transducers may be connected to each of the channels Ch1, Ch2, . . . , Chm of the receiver to deliver the reception signal to the receiver.

The ultrasonic probe 120 may be connected to the main body 101 through a cable 105 or using a wireless communication network to receive various signals necessary for controlling the ultrasonic probe 120 from a transmitter built in the main body 101, or transmit a reception signal corresponding to the ultrasonic echo signal received by the ultrasonic probe 120 to a receiver built in the main body 101.

The ultrasound device 100 may be provided with at least one ultrasonic probe 120. For convenience of description, a single ultrasonic probe 120 is illustrated in FIG. 2, and ultrasonic probes 120 are illustrated in FIG. 3.

The relay unit 130 may be connected to the transceiver 110, the ultrasonic probes 120, and the controller 150. The relay unit 130 may be connected to the transceiver 110 via channels Ch1, Ch2, . . . , Chm. The relay unit 130 may connect an ultrasonic probe (or a target ultrasonic probe) to be inspected among the ultrasonic probes 120 with the transceiver 110 based on the control signal (CS, see FIG. 4) delivered from the controller 150. The relay unit 130 may be embedded in a probe select assembly (PSA) board. The PSA board may be further provided with not only the relay unit 130, but also a selection signal transceiver for receiving a user selection signal generated from a sensor provided in the target ultrasonic probe and delivering to the controller 150.

The relay unit 130 may include relays Relay1, Relay2, . . . , Relaym for connecting any one ultrasonic probe among the ultrasonic probes 120 with the transceiver 110. Each of the relays Relay1, Relay2, . . . , Relaym may be connected to each of the channels Ch1, Ch2, . . . , and Chm connected to the transceiver 110. For example, the first relay Relay1 may be connected to the first channel Ch1, the second relay Relay2 may be connected to the second channel Ch2, and the m-th relay Relaym may be connected to the m-th channel Chm. The number of relays Relay1, Relay2, . . . , Relaym may be the same as the number of channels Ch1, Ch2, . . . , Chm connected to the transceiver 110.

Each of the relays Relay1, Relay2, . . . , Relaym may include ports P1, P2, . . . , Pn connected to the ultrasonic probes 120. Among the ports P1, P2, . . . , Pn included in each of the relays Relay1, Relay2, . . . , Relaym, the port connected to the target ultrasonic probe may be connected to each of the channels Ch1, Ch2, . . . , Chm. The number of ports P1, P2, . . . , Pn may be the same as the number of ultrasonic probes 120. Here, n may be a natural number of 3 or more.

The signal output unit 140 may be connected to the controller 150 and connected to the channels Ch1, Ch2, . . . , and Chm. The signal output unit 140 may be connected to the target ultrasonic probe via channels Ch1, Ch2, . . . , Chm. The signal output unit 140 may select any one channel (or a target channel) among the channels Ch1, Ch2, . . . , Chm connected to the target ultrasonic probe based on a selection signal (SS, see FIG. 4) provided by the controller 150. Accordingly, the signal output unit 140 may deliver a test input signal (TIS, see FIG. 4) provided by the controller 150 to the target ultrasonic probe through the target channel. The signal output unit 140 may be implemented as an analog multiplexer and may include at least one analog multiplexer.

The signal output unit 140 may receive a test output signal (TOS, see FIG. 7) reflected from the target ultrasonic probe, and deliver the test output signal TOS to the analog-to-digital converter 170.

In an embodiment, the ultrasound device 100 may include resistance elements R1, R2, . . . , Rm connected between the signal output unit 140 and the channels Ch1, Ch2, . . . , Chm. The resistance elements R1, R2, . . . , Rm may attenuate the test input signal TIS output from the signal output unit 140 to fit the input range of the ultrasonic probes 120. In an embodiment, the resistance value of the resistance elements R1, R2, . . . , Rm may be greater than the impedance of the channels Ch1, Ch2, . . . , Chm, and accordingly, by blocking the effect on signals (e.g., transmission signal, reception signal, etc.) delivered between the transceiver 220 and the ultrasonic probes 120, ultrasonic images may be output normally. In other words, the ultrasound device 100 may block the effect of the path for self-inspection of the ultrasonic probe on the ultrasonic image, by equipping resistance elements R1, R2, . . . , Rm. The number of resistance elements R1, R2, . . . , Rm may be the same as the number of channels Ch1, Ch2, . . . , Chm.

The controller 150 may include a processor 151 and a digital-to-analog converter 152. Processor 151 may include at least one of a microprocessor, a graphic processing unit, a random-access memory (RAM), and a read-only memory (ROM). In an embodiment, the controller 150 may be implemented in hardware such as a field programmable gate array (FPGA) or an application-specific integrated circuit (ASIC). However, it is not limited thereto, and the controller 150 may be implemented as an application processor (AP). The processor 151 may produce various signals that may control the operation of the internal configuration of the ultrasound device 100 and delivers to the internal configuration of the ultrasound device 100, or obtain information on the ultrasound device 100 based on various signals delivered from the internal configuration of the ultrasound device 100. The digital-to-analog converter 152 may digital-to-analog convert signals delivered from the processor 151 and deliver to internal configurations including the relay unit 130, the signal output unit 140, and the like.

The controller 150 may control the operation of the internal configurations of the ultrasound device 100. The controller 150 may output a transmission signal according to the transmission condition and control the transceiver 110 to receive the reception signal. The controller 150 may control the ultrasonic probes 120 to output a reception signal based on the transmission signal.

The controller 150 may control the relay unit 130 to select a target ultrasonic probe among the ultrasonic probes 120. For example, the user may select a target ultrasonic probe to be inspected, and the controller 150 may generate a control signal CS corresponding to the user's input and deliver to the relay unit 130.

The controller 150 may control the signal output unit 140 to select a target channel to which the test input signal TIS is to be delivered among the channels Ch1, Ch2, . . . , Chm connected to the target ultrasonic probe. For example, the user may select a target channel among the channels Ch1, Ch2, . . . , and Chm connected to the target ultrasonic probe to inspect for abnormality of the target ultrasonic probe, and the controller 150 may generate a selection signal SS corresponding to the user's input and deliver to the signal output unit 140. In addition, the controller 150 may deliver the test input signal TIS for inspection of the ultrasonic probe to the signal output unit 140.

The controller 150 may inspect for abnormality of the target ultrasonic probe based on the test output signal TOS delivered from the analog-to-digital converter 170. For example, the controller 150 may inspect for abnormality of the target ultrasonic probe by calculating the capacitance of the target ultrasonic probe based on the test output signal TOS.

The controller 150 may control the display unit 160 to notify the user by displaying whether there is an abnormality of the ultrasonic image and/or the target ultrasonic probe obtained based on the reception signal.

As shown in FIG. 2, the ultrasound device 100 according to an embodiment of the present disclosure may include a main body 101, a casper 102, an operation panel 103, an input means 104, a cable 105, a female connector 106, a male connector 107, an ultrasonic probe 120, and a display unit 160.

The ultrasonic probe 120 may be connected to the main body 101 through the cable 105 to receive various signals necessary for controlling the ultrasonic probe 120, or deliver the reception signal corresponding to the ultrasonic echo signal received by the ultrasonic probe 120 to the main body 101. The reception signal is a signal converted from an ultrasonic echo signal to an electrical signal by the ultrasonic probe 120, and may be either an analog signal or a digital signal.

One side of the main body 101 may be provided with one or more female connectors 106. The female connector 106 may be physically coupled with a male connector 107 provided at one end of the cable 105.

However, embodiments of the ultrasonic probe 120 are not limited thereto, and the ultrasonic probe 120 may be wirelessly connected to the main body 101. In this case, the ultrasonic probe 120 may implemented as a wireless probe making it possible to exchange signals through a network formed between the ultrasonic probe 120 and the main body 101. In addition, as shown in FIG. 3, ultrasonic probes 120 may be connected to one main body 101.

The bottom of the main body 101 may be provided with casters 102 for moving the ultrasound device 100. Using casters 102, the user may fix or move the ultrasound device 100. Such an ultrasound device 100 may be named as a cart-type ultrasound device.

The front side of the main body 101 may be provided with an operation panel 103. An input means 104 for receiving a user's input may be formed in the operation panel 103, and the user may input commands for starting diagnosis, selecting a diagnostic site, selecting a diagnosis type, selecting a mode for an ultrasonic image, self-inspection, and the like through the input means 104.

The display unit 160 may be provided on top of the main body 101. The display unit 160 may be implemented as at least one of various display panels such as a liquid crystal display (LCD) panel, a light emitting diode (LED) panel, or an organic light emitting diode (OLED) panel.

The display unit 160 may be composed of two or more displays, and each display may display different images at the same time. For example, one display may display a 2D ultrasonic image, and the other display may display a 3D ultrasonic image. Alternatively, one display may display a B-mode image and the other display may display a contrast agent image. Alternatively, one display may display an ultrasonic image and the other display may display waveform information of the transmission signal.

The display unit 160 may display an ultrasonic image based on a reception signal received from the ultrasonic probe 120. A user such as a doctor may perform a diagnosis of a specific disease using an ultrasonic image displayed on the display unit 160, and the site of obtaining an ultrasonic image may vary depending on the disease to be diagnosed.

The display unit 160 may display whether there is an abnormality of the target ultrasonic probe. A user such as a doctor may determine whether the ultrasound device 100 is operating normally based on whether there is an abnormality of the target ultrasonic probe displayed in the display unit 160, thereby protecting the patient from abnormal operation during use of the ultrasound device 100 and reducing the probability of misdiagnosis.

On the outer circumferential surface of the main body 101, one or more probe holders for mounting the ultrasonic probe 120 may be provided. Thus, when the user does not use the ultrasonic probe 120, the ultrasonic probe 120 may be mounted and stored in the probe holder.

A transceiver 110, a relay unit 130, a signal output unit 140, a controller 150, and an analog-to-digital converter 170 may be built in the main body 101.

The appearance of the ultrasound device 100 according to an embodiment of the present disclosure is not limited to the example of FIG. 2. For example, the ultrasound device 100 may be implemented portablely. When the ultrasound device 100 is implemented portablely, the main body 101 may have a shape such as a laptop computer, a PDA, a tablet PC, and the like, and the ultrasonic probe 120 may be connected to the main body 101 to generate an ultrasonic image.

Meanwhile, the ultrasonic probe 120 has a complex structure including a large number of elements including piezoelectric materials, and the multiple resonance phenomena resulting from this complex structure may act as a factor that makes it difficult to determine whether there is an abnormality of the ultrasonic probe 120. In addition, due to the complex characteristics of the ultrasonic probe 120 described above, the variability of the signal for determining whether there is an abnormality of the ultrasonic probe 120 is irregular, and accordingly, it may be difficult to set a reference value of the signal, select the frequency of the signal, and manage it. The ultrasound device 100 according to an embodiment of the present disclosure may solve the above-described issue by simply and efficiently inspecting whether there is an abnormality of the ultrasonic probe without a separate inspection device.

FIGS. 4 to 8 are diagrams illustrating a self-inspection method of an ultrasound device in accordance with an embodiment of the present disclosure. FIG. 9 is a diagram illustrating a test input signal and a test output signal.

Figure 4:
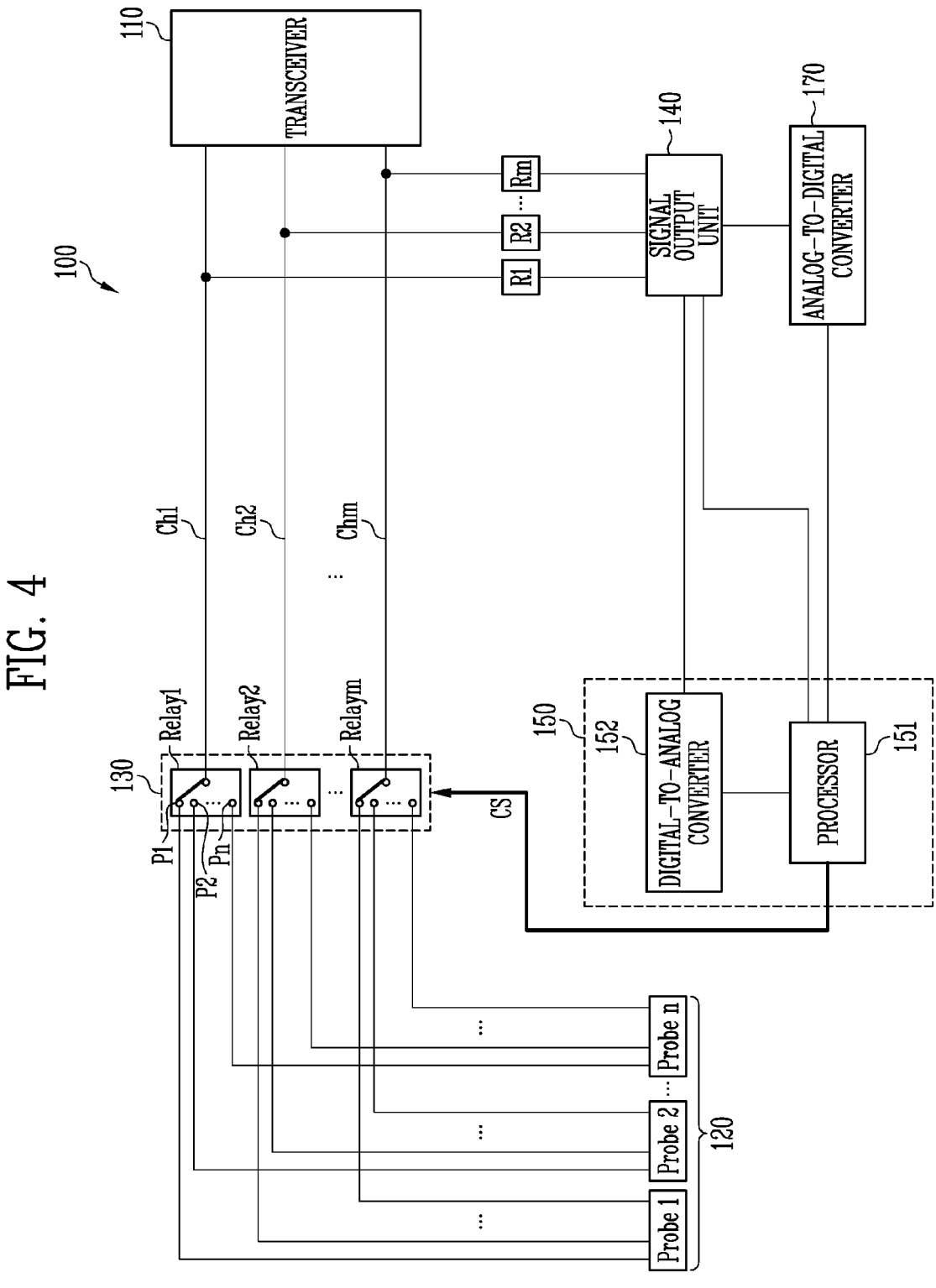
FIGS. 4, 5, 6, 7 and 8 are diagrams illustrating a self-inspection method of an ultrasound device in accordance with an embodiment of the present disclosure.

First, referring to FIG. 4, the controller 150 may generate a control signal CS and deliver to the relay unit 130. The control signal CS may be a signal corresponding to a user's input selecting a target ultrasonic probe to be inspected. For example, the processor 151 may generate a control signal CS in digital form and deliver to the relay unit 130.

The relay unit 130 may connect the target ultrasonic probe and the channels Ch1, Ch2, . . . , Chm based on the control signal CS delivered from the controller 150. For example, the target ultrasonic probe may be a first ultrasonic probe probe 1, and the relay unit 130 may connect the first ultrasonic probe probe 1 and the channels Ch1, Ch2, . . . , Chm by turning on the first port P1 included in each of the relays Relay1, Relay2, . . . , Relaym and connected to the first ultrasonic probe probe 1.

Figure 5:
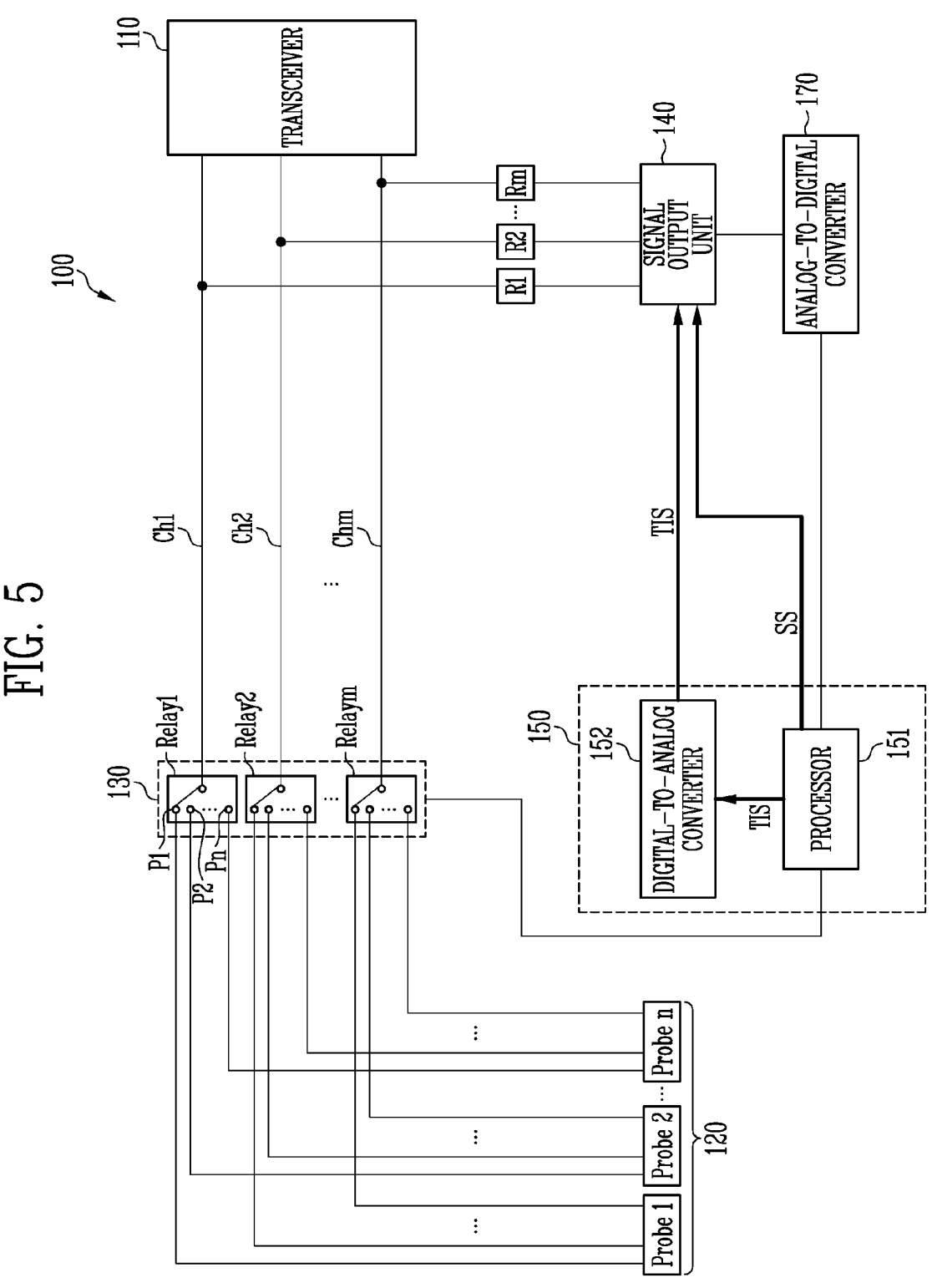

Next, referring to FIG. 5, the controller 150 may generate a selection signal SS and a test input signal TIS and deliver to the signal output unit 140. For example, the processor 151 may generate a test input signal TIS in digital form and deliver to the digital-to-analog converter 152, and the digital-to-analog converter 152 may convert the test input signal TIS in digital form into a test input signal TIS in analog form and deliver to the signal output unit 140. In addition, the processor 151 may generate a selection signal SS of digital form and deliver to the signal output unit 140. The selection signal SS may be a signal corresponding to a user's input selecting a target channel for inspecting for abnormality of the target ultrasonic probe.

The test input signal TIS may be an inspection signal for inspecting for abnormality of the target ultrasonic probe. In an embodiment, the test input signal TIS may be a rectangular pulse. In an embodiment, the frequency of the test input signal TIS may be less than the frequency of the ultrasonic signal generated by each of the ultrasonic probes 120. For example, the frequency of the test input signal TIS may be tens of kHz. However, the form and/or frequency of the test input signal TIS are not limited to the above-described example, and the form and/or frequency of the test input signal TIS may be variously changed within a range where a normal ultrasonic image may be output since the ultrasonic signal is not affected or the effect on the ultrasonic signal is insignificant.

Figure 6:
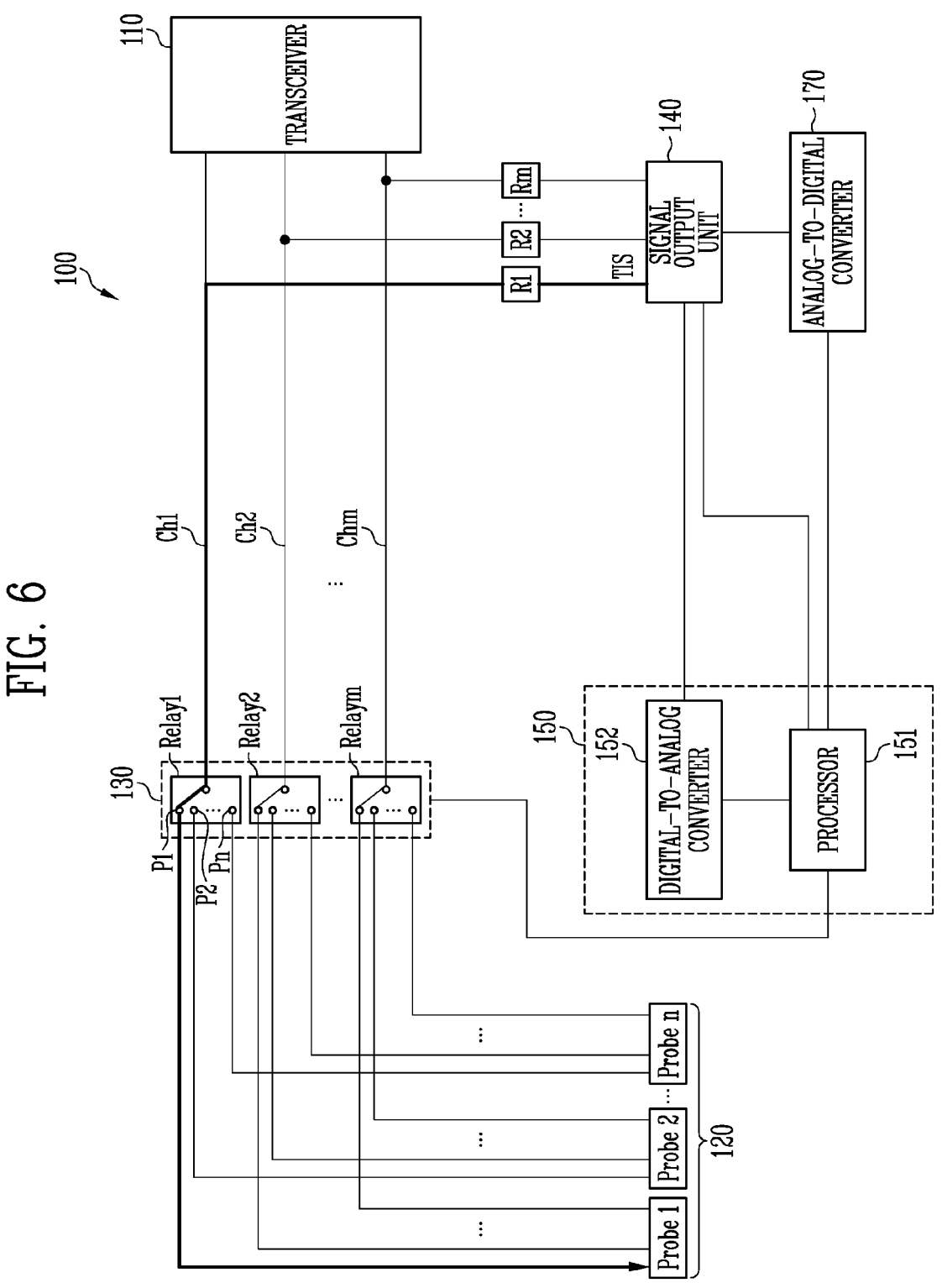

Next, referring to FIG. 6, the signal output unit 140 may select a target channel to which the test input signal TIS is to be delivered among channels Ch1, Ch2, . . . , Chm connected to the target ultrasonic probe based on the selection signal SS delivered from the controller 150. To this end, the signal output unit 140 may include a switch digitally controlled to be connected to any one channel among the channels Ch1, Ch2, . . . , Chm. For example, the signal output unit 140 may select a first channel Ch1 as a target channel among channels Ch1, Ch2, . . . , Chm connected to the first ultrasonic probe Probe 1 which is a target ultrasonic probe based on the selection signal SS in digital form delivered from the processor 151.

The signal output unit 140 may deliver the test input signal TIS to the target ultrasonic probe through the target channel. For example, the signal output unit 140 may deliver the test input signal TIS to the first ultrasonic probe Probe 1 which is a target ultrasonic probe through the first channel Ch1 which is a target channel.

Figure 7:
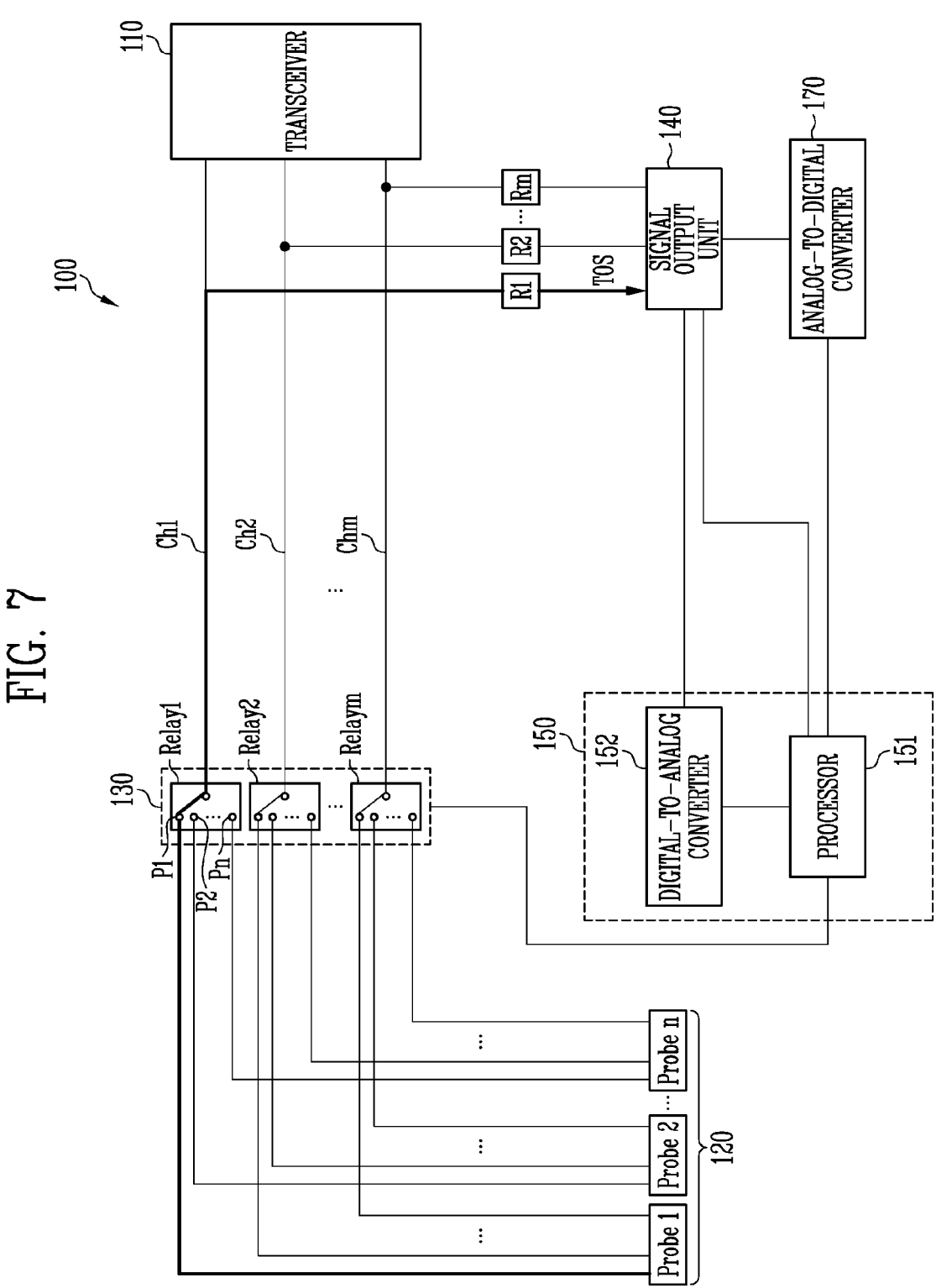

Next, referring to FIG. 7, the signal output unit 140 may receive a test output signal TOS from the target ultrasonic probe. The test output signal TOS may be a signal generated by the test input signal TIS reflected from the target ultrasonic probe. For example, the signal output unit 140 may receive a test output signal TOS generated by the test input signal TIS reflected from the first ultrasonic probe Probe 1 which is a target ultrasonic probe, through the first channel Ch1 which is a target channel.

Figure 8:
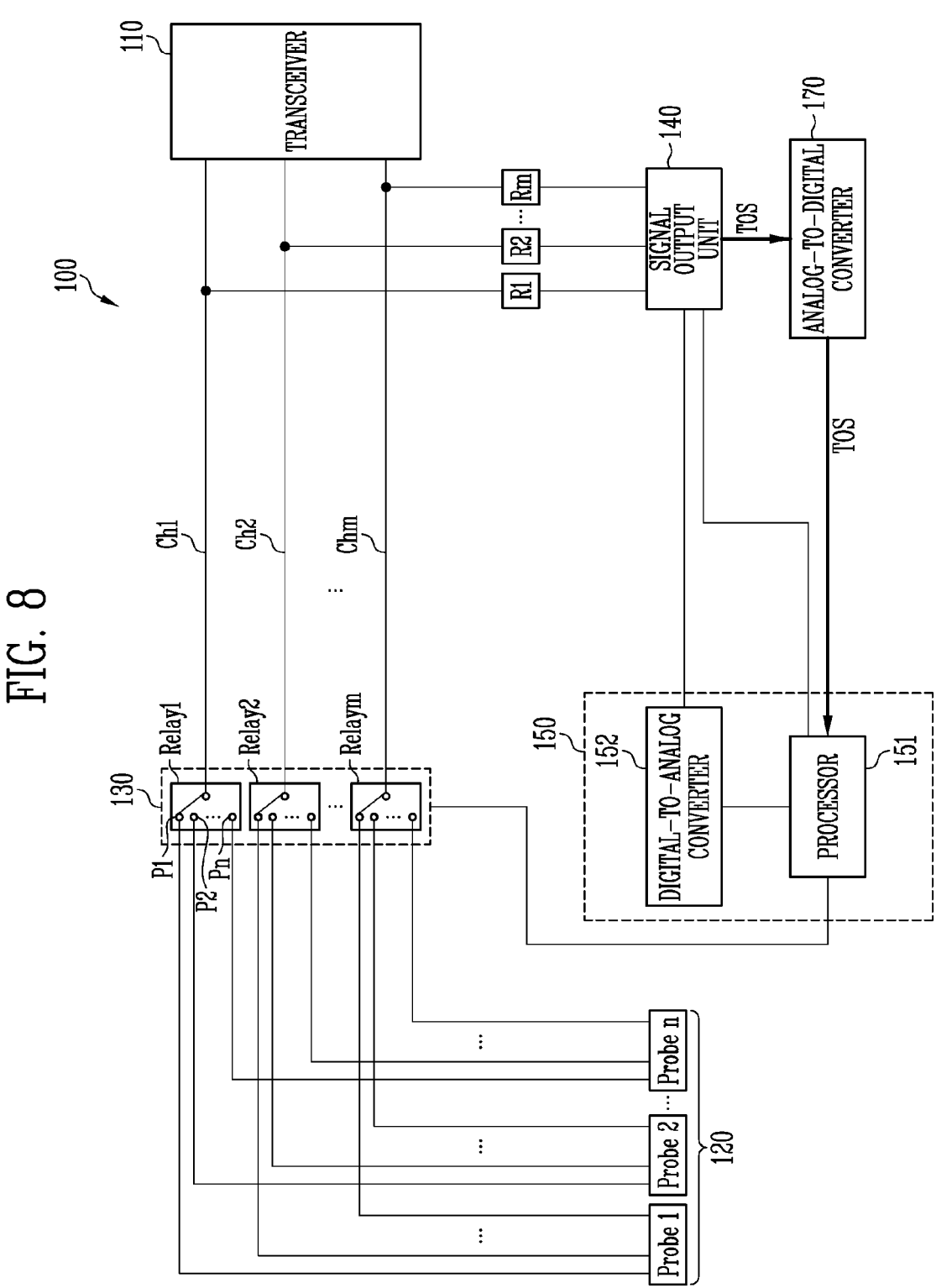
Figure 9:
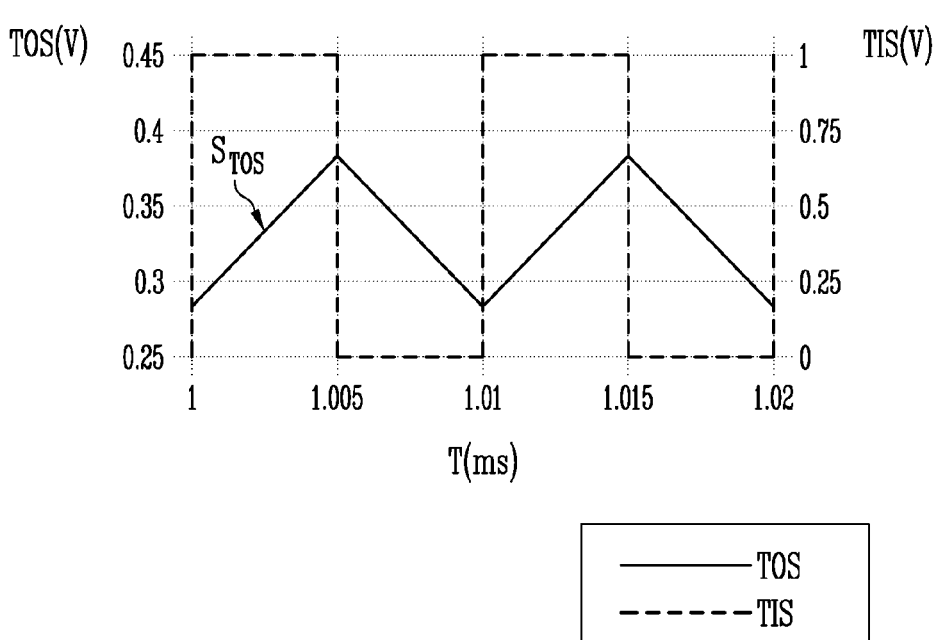
FIG. 9 is a diagram illustrating a test input signal and a test output signal.

Next, referring to FIG. 8, the signal output unit 140 may deliver the test output signal TOS to the analog-to-digital converter 170, and the analog-to-digital converter 170 may deliver the test output signal TOS to the controller 150. For example, the analog-to-digital converter 170 may analog-to-digital convert the test output signal TOS in analog form delivered from the signal output unit 140 and deliver the test output signal TOS in digital form to the processor 151.

Referring to FIGS. 8 and 9, the controller 150 may calculate the capacitance of the target ultrasonic probe based on the test output signal TOS delivered from the analog-to-digital converter 170. For example, the processor 151 may calculate the capacitance of the target ultrasonic probe based on the slope $S_{TOS}$ of the test output signal. The slope $S_{TOS}$ of the test output signal may mean the amount of change in the magnitude (or voltage) of the test output signal TOS according to the amount of change in time.

$$Q = C \cdot V \qquad \text{(Equation 1)}$$

$$\frac{dQ}{dt} = C \cdot \frac{dV}{dt} \qquad \text{(Equation 2)}$$

$$I = C \cdot S_{TOS} \qquad \text{(Equation 3)}$$

Referring to Equation 1, the quantity of electric charge Q of the target ultrasonic probe is equal to the product of the capacitance C and voltage V of the target ultrasonic probe, and Equation 1 is equal to Equation 2 when both sides of are differentiated with time. Referring to Equations 2 and 3, the amount of change in the quantity of electric charge of the target ultrasonic probe according to the amount of change in time is equal to the current I, and the amount of change of voltage according to the amount of change in time is equal to the slope $S_{TOS}$ of the test output signal shown in FIG. 9.

$$\frac{V_{TIS}}{R} = C \cdot S_{TOS} \qquad \text{(Equation 4)}$$

$$C = \frac{V_{TIS}}{R \cdot S_{TOS}} \qquad \text{(Equation 5)}$$

Referring to Equation 4, the current is equal to the ratio of the voltage $V_{TIS}$ of the input test signal to the resistance R through which the input test signal TIS passes. Here, the resistance R through which the input test signal TIS passes may be resistance element of any one of the resistive elements R1, R2, . . . , Rm. Referring to Equations 4 and 5, the capacitance C of the target ultrasonic probe may be calculated based on the voltage $V_{TIS}$ of the test input signal, the resistance R through which the input test signal TIS passes, and the slope of the test output signal $S_{TOS}$. Given that the voltage $V_{TIS}$ of the test input signal and the resistance R through which the input test signal TIS passes are independent variables, the processor 151 may calculate the capacitance C of the target ultrasonic probe based on the slope $S_{TOS}$ of the test output signal, which is the dependent variable.

The controller 150 may inspect for abnormality of the target ultrasonic probe based on the calculated capacitance C of the target ultrasonic probe. Here, whether there is an abnormality of the target ultrasonic probe may be determined by inspecting whether the channels Ch1, Ch2, . . . , Chm connected to the target ultrasonic probe are defective. In other words, the controller 150 may determine whether there is an abnormality of the target ultrasonic probe by inspecting whether the target channel connected to the target ultrasonic probe is defective when inspecting for abnormality of the target ultrasonic probe.

In an embodiment, the controller 150 may inspect for abnormality of the target ultrasonic probe based on the calculated capacitance C of the target ultrasonic probe and a preset reference value. The preset reference value may be the initial capacitance of the target ultrasonic probe. The initial capacitance may mean the capacitance measured during the manufacture of the target ultrasonic probe. In other words, the controller 150 may compare the calculated capacitance C of the target ultrasonic probe with the initial capacitance of the target ultrasonic probe to inspect whether the target channel is defective. For example, when the calculated capacitance C of the target ultrasonic probe is within ±10% of the initial capacitance, processor 151 may determine that the target channel is normal. On the other hand, when the calculated capacitance C of the target ultrasonic probe deviates from ±10% of the initial capacitance, the processor 151 may determine that the target channel is defective. As such, when it is determined that the target channel is defective, the processor 151 may determine that there is an abnormality in the target ultrasonic probe.

Figure 10:
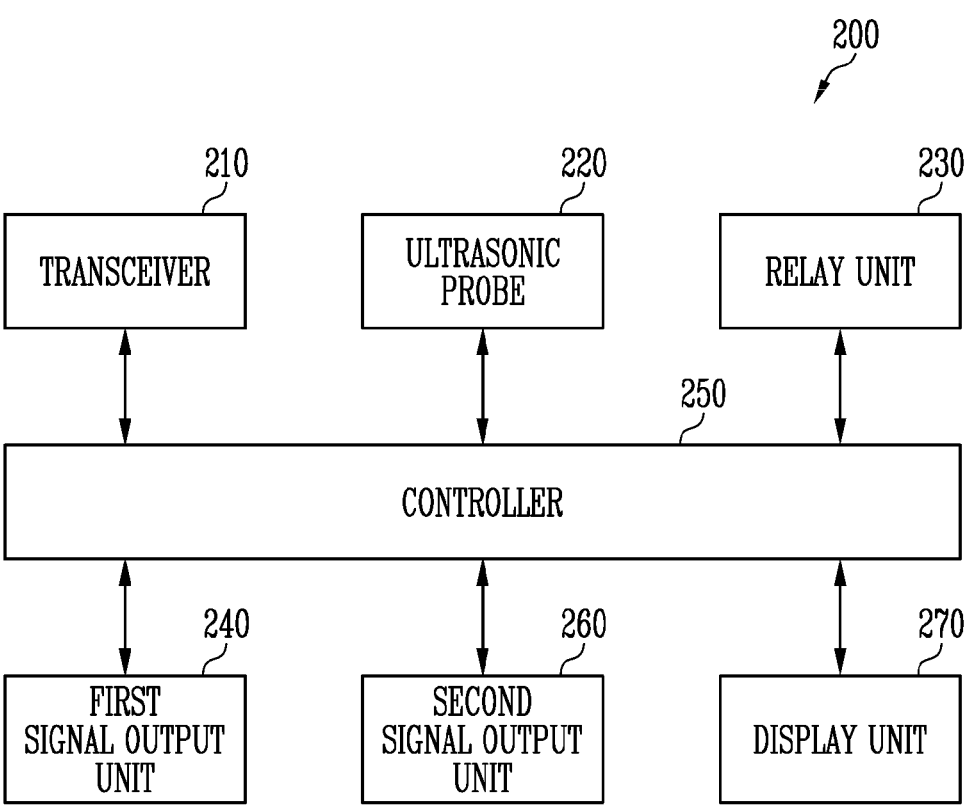
FIG. 10 is a block diagram of an ultrasound device in accordance with an embodiment of the present disclosure.
Figure 11:
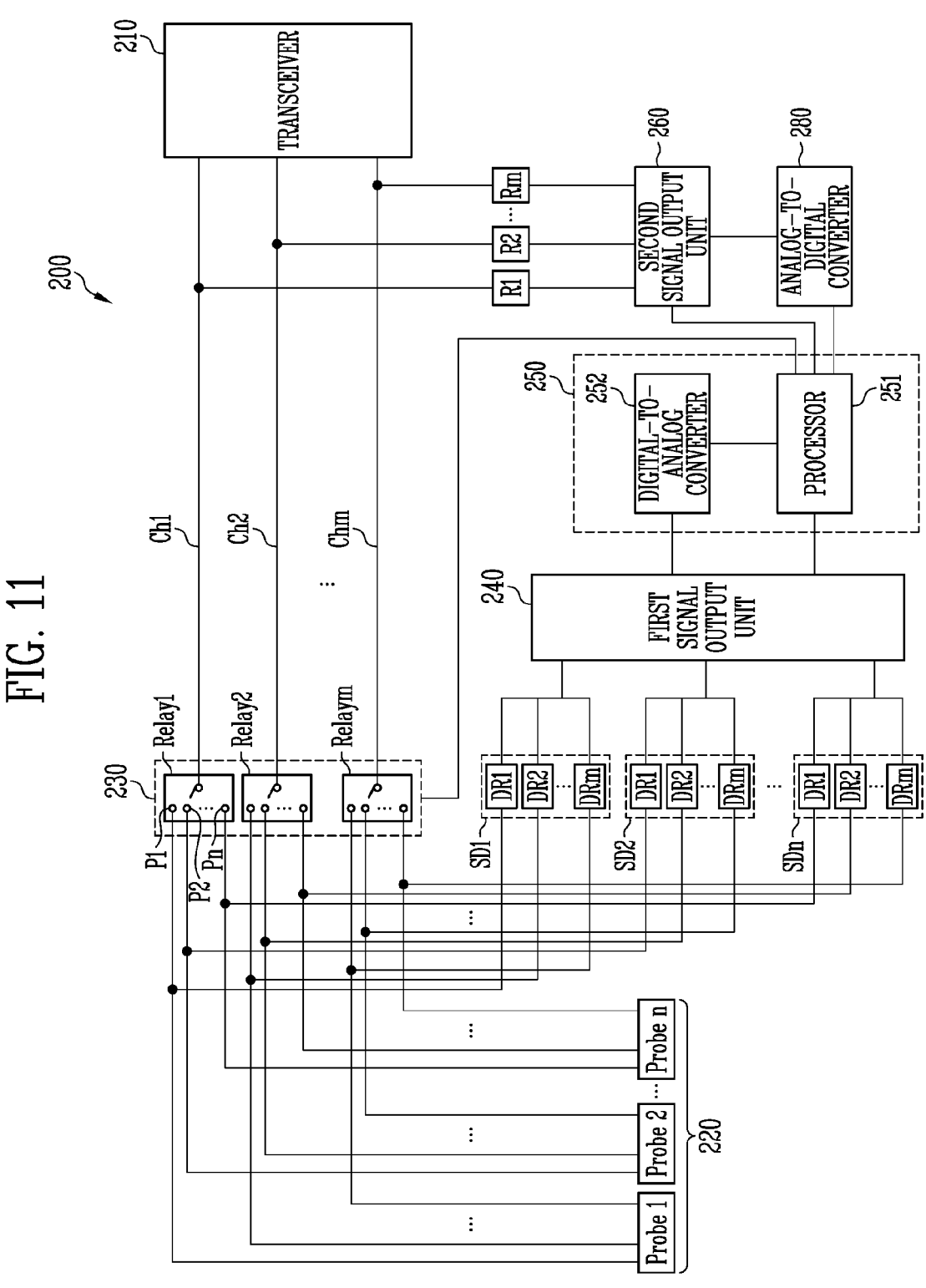
FIG. 11 is a circuit diagram of an ultrasound device in accordance with an embodiment of the present disclosure.

FIG. 10 is a block diagram of an ultrasound device in accordance with an embodiment of the present disclosure. FIG. 11 is a circuit diagram of an ultrasound device in accordance with an embodiment of the present disclosure. With respect to FIGS. 10 and 11, descriptions of overlapping contents with the foregoing contents are simplified or omitted.

Prior to the description, conventionally, it was possible to inspect for abnormality of the relay unit 230 only when a dummy probe is coupled to the main body or the like of the ultrasound device shown in FIG. 2. However, due to the issues such as difficulties in managing the dummy probe, user's inconvenience caused by attaching and detaching the dummy probe, and compatibility in which a dummy probe must be developed correspondingly when the number of channels is changed, inspecting for abnormality of the relay unit 230 may not be easy. On the other hand, the ultrasound device 200 according to an embodiment of the present disclosure may inspect for abnormality of the relay unit 230 regardless of whether the ultrasonic probes 220 are coupled.

Referring to FIG. 10, the ultrasound device 200 according to an embodiment of the present disclosure may include a transceiver 210, an ultrasonic probe 220, a relay unit 230, a first signal output unit 240, a controller 250, a second signal output unit 260, and a display unit 270.

The configuration and function of the transceiver 210 may be the same as the transceiver 110 of FIG. 1 described above.

The configuration and function of the ultrasonic probe 220 may be the same as the ultrasonic probe 120 of FIG. 1 described above.

The relay unit 230 may connect some of the ports P1, P2, . . . , Pn to the channels Ch1, Ch2, . . . , Chm based on the control signal delivered from the controller 250. For example, the relay unit 230 may turn on the target ports to be inspected based on the first control signal CS1 (see FIG. 14) delivered from the controller 150. Based on the second control signal CS2 (see FIG. 17) delivered from the controller 150, the relay unit 230 may turn on ports different from the target ports. Other configuration and function of the relay unit 230 may be the same as the relay unit 130 of FIG. 1 described above.

The first signal output unit 240 may be connected to signal distributors SD1, SD2, . . . , SDn, and may be connected to the controller 250. The first signal output unit 240 may select one signal distributor to which a test signal TS (see FIG. 12) delivered from the controller 250 is to be output among the signal distributors SD1, SD2, . . . , SDn based on the first selection signal SS1 (see FIG. 12) delivered from the second controller 250. In other words, the first signal output unit 240 may output the test signal TS to one signal distributor among the signal distributors SD1, SD2, . . . , SDn. The first signal output unit 240 may be implemented as a switching element and switched to one signal distributor among the signal distributors SD1, SD2, . . . , SDn according to the first selection signal SS1. Alternatively, the first signal output unit 240 may be implemented as an analog multiplexer and may include at least one analog multiplexer.

In an embodiment, the ultrasound device 200 may include signal distributors SD1, SD2, . . . , SDn. Each of the signal distributors SD1, SD2, . . . , SDn may be connected to each of the ports P1, P2, . . . , Pn. For example, the first signal distributor SD1 may be connected to the first ports P1 included in each of the relays Relay1, Relay2, . . . , Relaym, the second signal distributor SD2 may be connected to the second ports P2 included in each of the relays Relay1, Relay2, . . . , Relaym, and the n-th signal distributor SDn may be connected to n-th ports Pn included in each of the relays Relay1, Relay2, . . . , Relaym. The number of signal distributors SD1, SD2, . . . , SDn may be the same as the number of ports P1, P2, . . . , Pn. Here, n may be a natural number of 3 or more.

Each of the signal distributors SD1, SD2, . . . , SDn may include distribution resistors DR1, DR2, . . . , DRm. Each of the signal distributors SD1, SD2, . . . , SDn may distribute the signal output from the first signal output unit 240 through the distribution resistors DR1, DR2, . . . , DRm. Accordingly, the distributed signals may be delivered to each of the ports P1, P2, . . . , Pn connected to each of the signal distributors SD1, SD2, . . . , SDn. The number of distribution resistors DR1, DR2, . . . , DRm included in each of the signal distributors SD1, SD2, . . . , SDn may be the same as the number of the channels Ch1, Ch2, . . . , Chm. Accordingly, the total number of distribution resistors DR1, DR2, . . . , DRm may be equal to the number obtained by multiplying the number of ports P1, P2, . . . , Pn by the number of channels Ch1, Ch2, . . . , Chm. Here, m may be a natural number of 3 or more.

In an embodiment, the resistance value of the distribution resistors DR1, DR2, . . . , DRm may be greater than the impedance of the channels Ch1, Ch2, . . . , Chm, and accordingly, by blocking the effect on the signals (eg, transmission signal, reception signal, etc.) delivered between the transceiver 110 and the ultrasonic probe 120, the ultrasonic image may be output normally. In other words, the resistance values of the distribution resistors DR1, DR2, . . . , DRm may be set to block the effect on the ultrasonic image of the path for self-inspection of the relay unit 230.

The controller 250 may include a processor 251 and a digital-to-analog converter 252. The configuration and function of the processor 251 and the digital-to-analog converter 252 may be the same as the processor 151 and digital-to-analog converter 152 of FIG. 1. The controller 250 may generate various signals capable of controlling the operation of the relay unit 230, the first signal output unit 240, the second signal output unit 260, and the analog-to-digital converter 280. In addition, the controller 250 may generate various signals capable of controlling the operation of other internal configurations or obtain information on the ultrasound device 200 based on various signals delivered from the internal configurations of the ultrasound device 200.

The second signal output unit 260 may output one signal among the signals input through the channels Ch1, Ch2, . . . , Chm to the analog-to-digital converter 280 based on the control signal delivered from the controller 250. The second signal output unit 260 may be implemented as an analog demultiplexer and may include at least one analog demultiplexer.

The function and configuration of the analog-to-digital converter 280 may be the same as the analog-to-digital converter 170 of FIG. 1 described above.

FIGS. 12 to 16 are diagrams illustrating a self-inspection method of an ultrasound device in accordance with an embodiment of the present disclosure.

Figure 12:
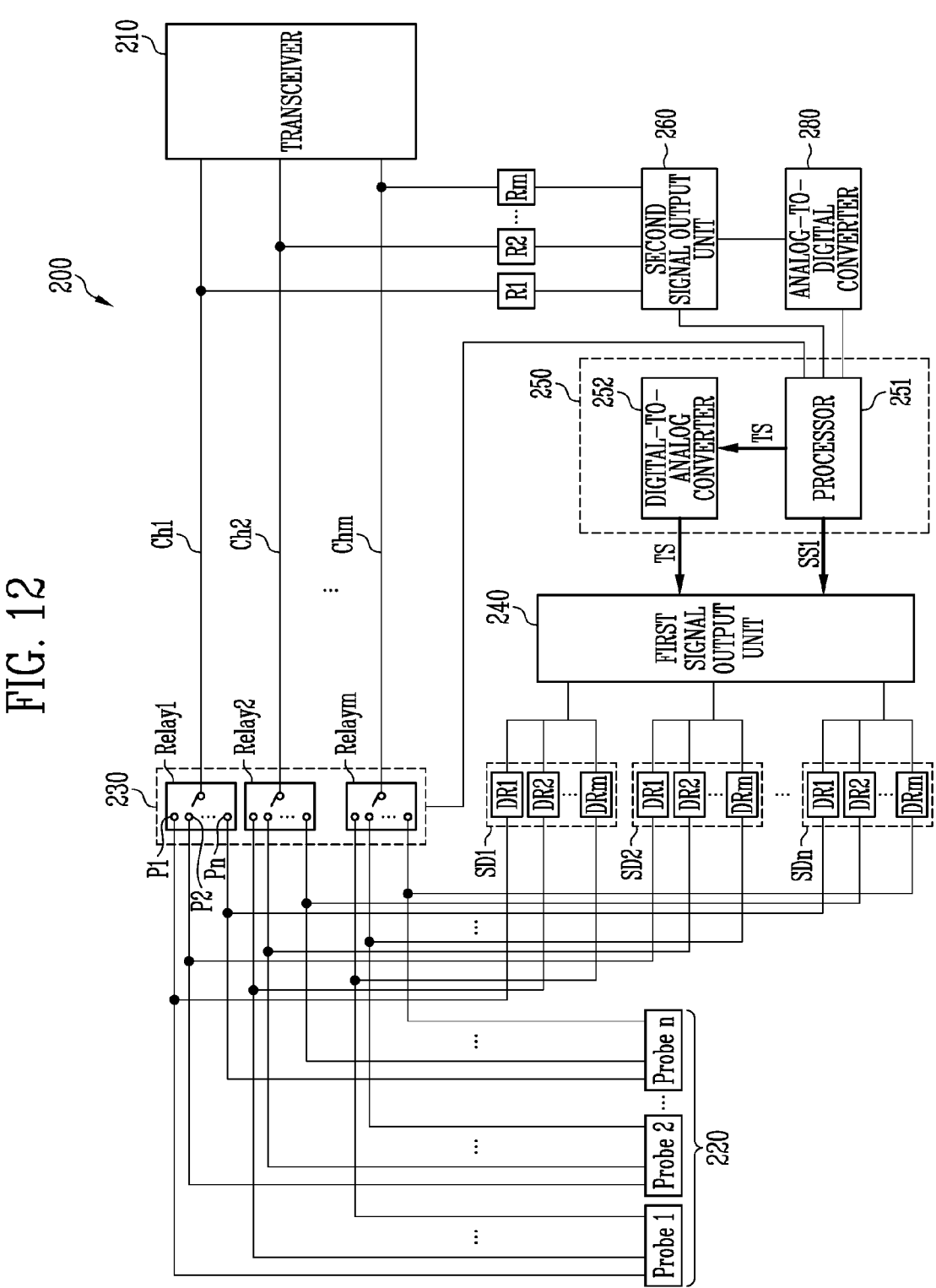
FIGS. 12, 13, 14, 15 and 16 are diagrams illustrating a self-inspection method of an ultrasound device in accordance with an embodiment of the present disclosure.

First, referring to FIG. 12, the controller 250 may generate a test signal TS and a first selection signal SS1, and deliver to the first signal output unit 240. For example, the processor 251 may generate a test signal TS in digital form and deliver to the digital-to-analog converter 252, and the digital-to-analog converter 252 may convert the test signal TS in digital form into a test signal TS in analog form and deliver to the first signal output unit 240. In addition, the processor 251 may generate a first selection signal SS1 in digital form and deliver to the first signal output unit 240.

The test signal TS may be an inspection signal for inspecting for abnormality of the relay unit 230. In an embodiment, the waveform of the test signal TS may be variable. The waveform of the test signal TS may be understood as a concept including information such as amplitude, shape, and frequency of the test signal TS. In an embodiment, the frequency of the test signal TS may vary depending on whether the ultrasonic probes 120 are connected. For example, when the ultrasonic probes 120 are connected to the ultrasound device 200, the frequency of the test signal TS may be set to tens of kHz less than the frequency of the ultrasonic signal. On the other hand, when the ultrasonic probes 120 are not connected to the ultrasound device 200, the frequency of the test signal TS may be variously set regardless of the frequency of the ultrasonic signal.

The first selection signal SS1 may be a signal for selecting a signal distributor to which the test signal TS is to be input among the signal distributors SD1, SD2, . . . , SDn. Alternatively, the first selection signal SS1 may be a signal for selecting target ports to be inspected among the ports P1, P2, . . . , Pn included in each of the relays Relay1, Relay2, . . . , Relaym.

As such, the controller 250 may generate a test signal TS and a first selection signal SS1 for inspecting for abnormality of the relay unit 230 regardless of whether the ultrasonic probes 120 are coupled. The test signal TS and the first selection signal SS1 may be generated in response to a user's input through wire or a remote signal through wireless.

Figure 13:
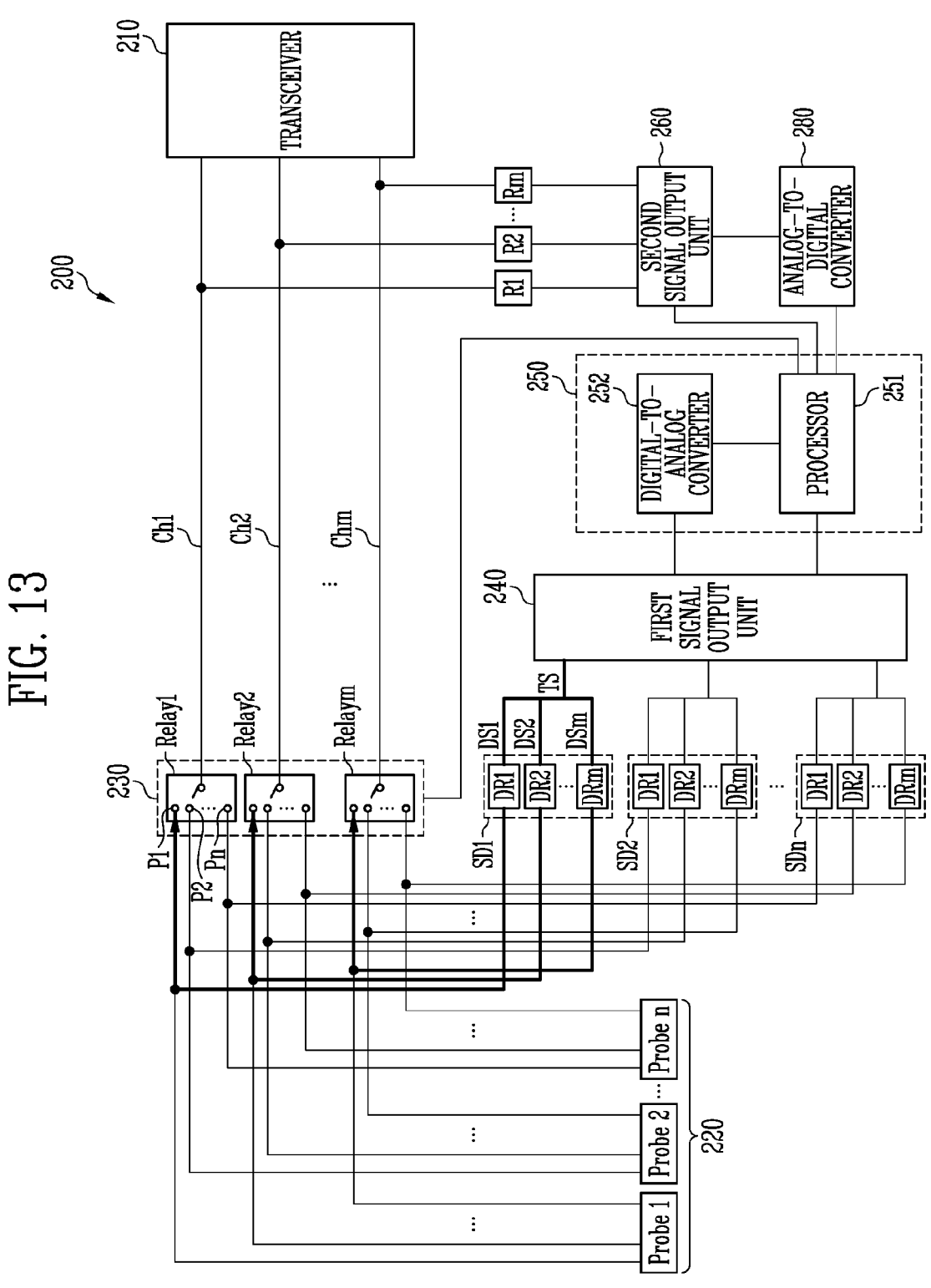

Next, referring to FIG. 13, the first signal output unit 240 may select a signal distributor to which the test signal TS is delivered among the signal distributors SD1, SD2, . . . , SDn based on the first selection signal SS1. To this end, the first signal output unit 240 may include a switch digitally controlled to be connected to any one signal distributor among the signal distributors SD1, SD2, . . . , SDn. For example, the first signal output unit 240 may output the test signal TS to the first signal distributor SD1 based on the first selection signal SS1 in digital form delivered from the processor 251.

The test signal TS may be distributed to the distribution signals DS1, DS2, . . . , DSm by the distribution resistors DR1, DR2, . . . , DRm of the first signal distributor SD1. Thereafter, the distribution signals DS1, DS2, . . . , DSm may be delivered to the target ports to be inspected. For example, each of the distribution signals DS1, DS2, . . . , DSm may be delivered to each of the first ports P1 corresponding to the target ports.

Figure 14:
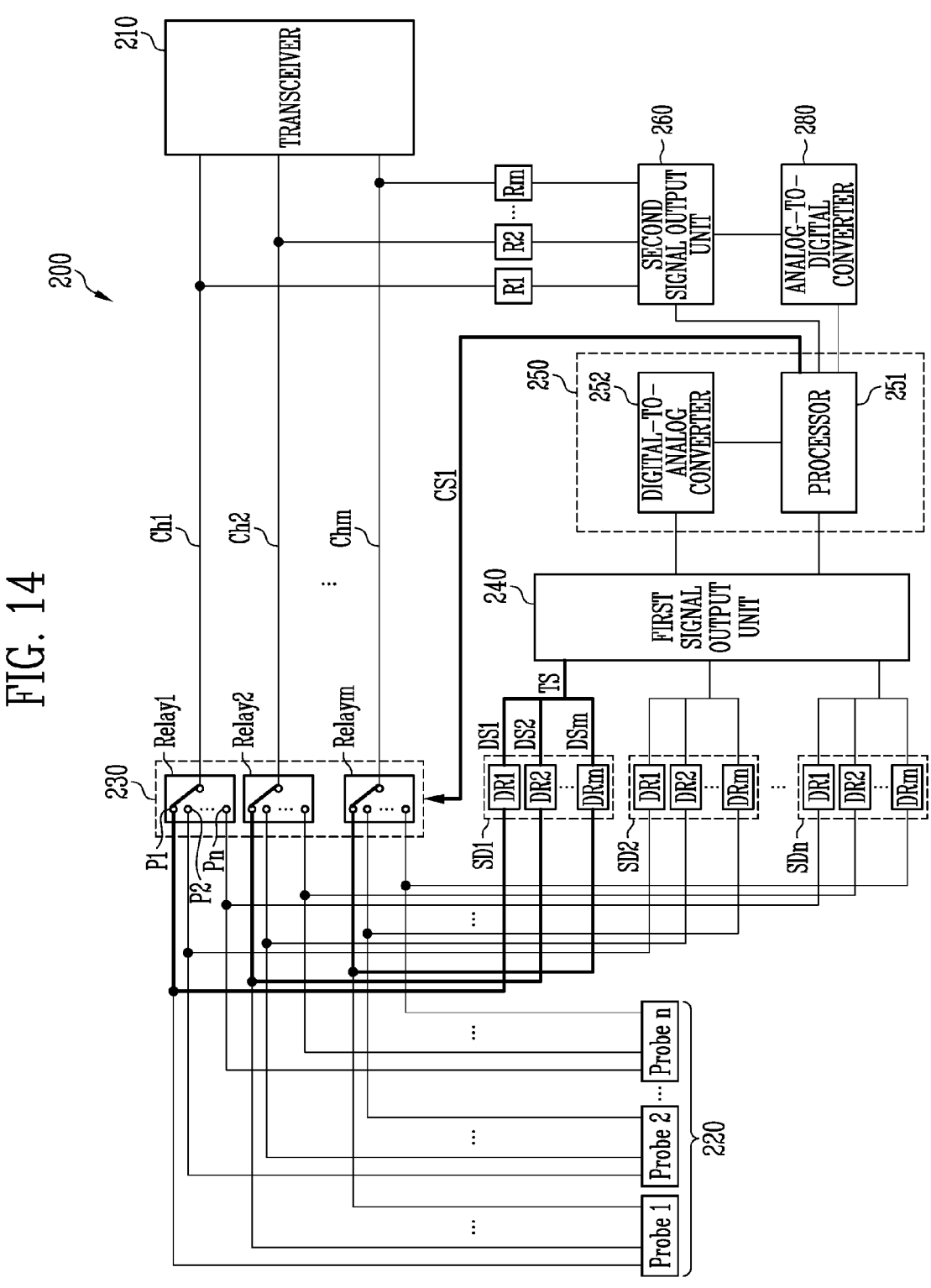

Next, referring to FIG. 14, the processor 251 may generate a first control signal CS1 in digital form and deliver to the relay unit 230.

The first control signal CS1 may be a signal for inspecting whether the relay unit 230 is connected. Alternatively, the first control signal CS1 may be a signal for inspecting whether the target ports of the relay unit 230 are connected. The first control signal CS1 may be generated in response to a user's input through wire or a remote signal through wireless.

The relay unit 230 may connect the target ports with channels based on the first control signal CS1. For example, the relay unit 230 may connect each of the first ports P1, which are target ports, and each of the channels Ch1, Ch2, . . . , Chm based on the first control signal CS1.

Figure 15:
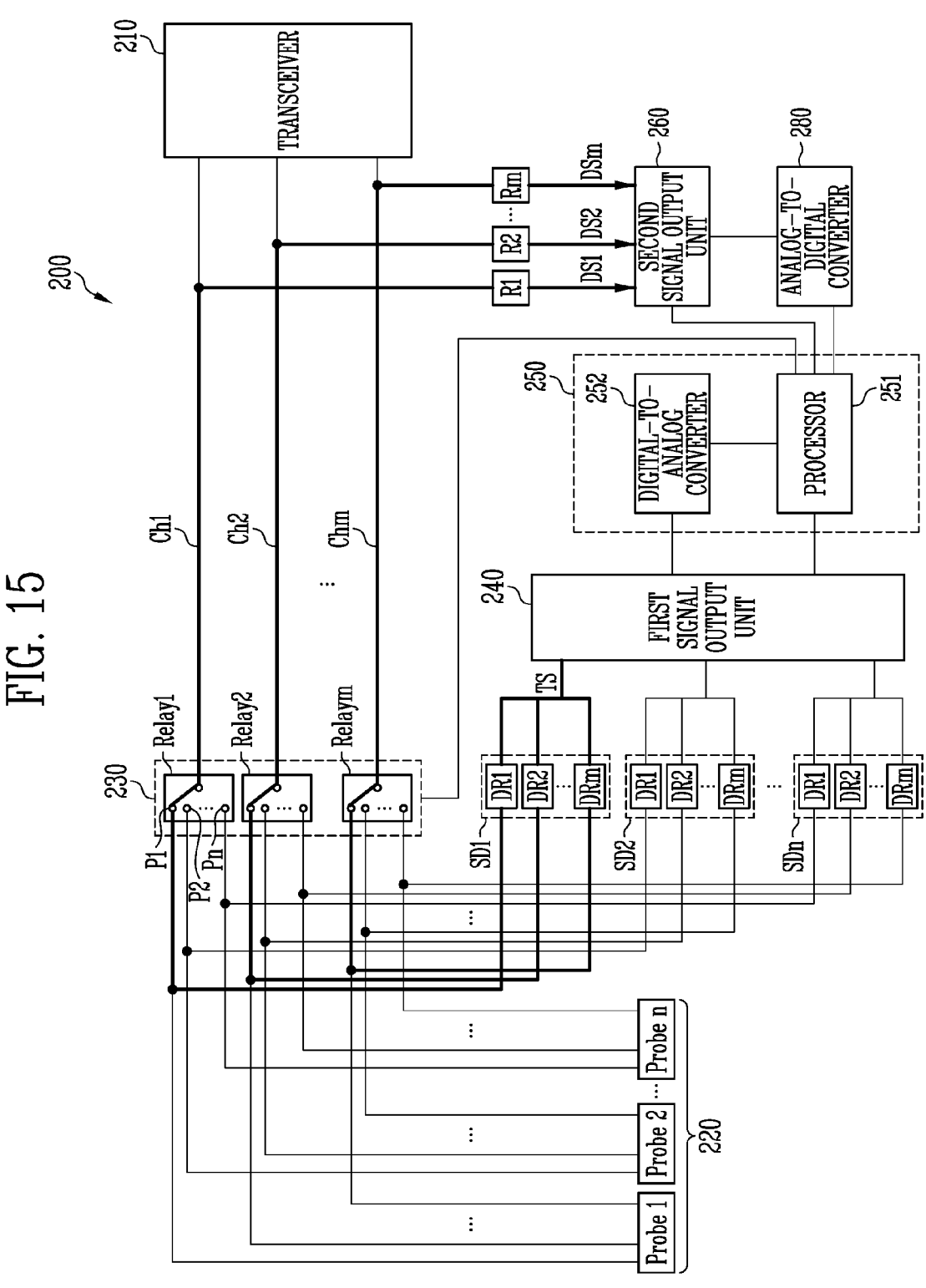

Next, referring to FIG. 15, the second signal output unit 260 may receive distribution signals delivered through channels connected to target ports. For example, the second signal output unit 260 may receive the first distribution signal DS1 through the first channel Ch1 connected to the first port P1 of the first relay Relay1, receive the second distribution signal DS2 through the second channel Ch2 connected to the first port P1 of the second relay Relay2, and receive the m-th distribution signal DSm through the m-th channel Chm connected to the first port P1 of the m-th relay Relaym.

Figure 16:
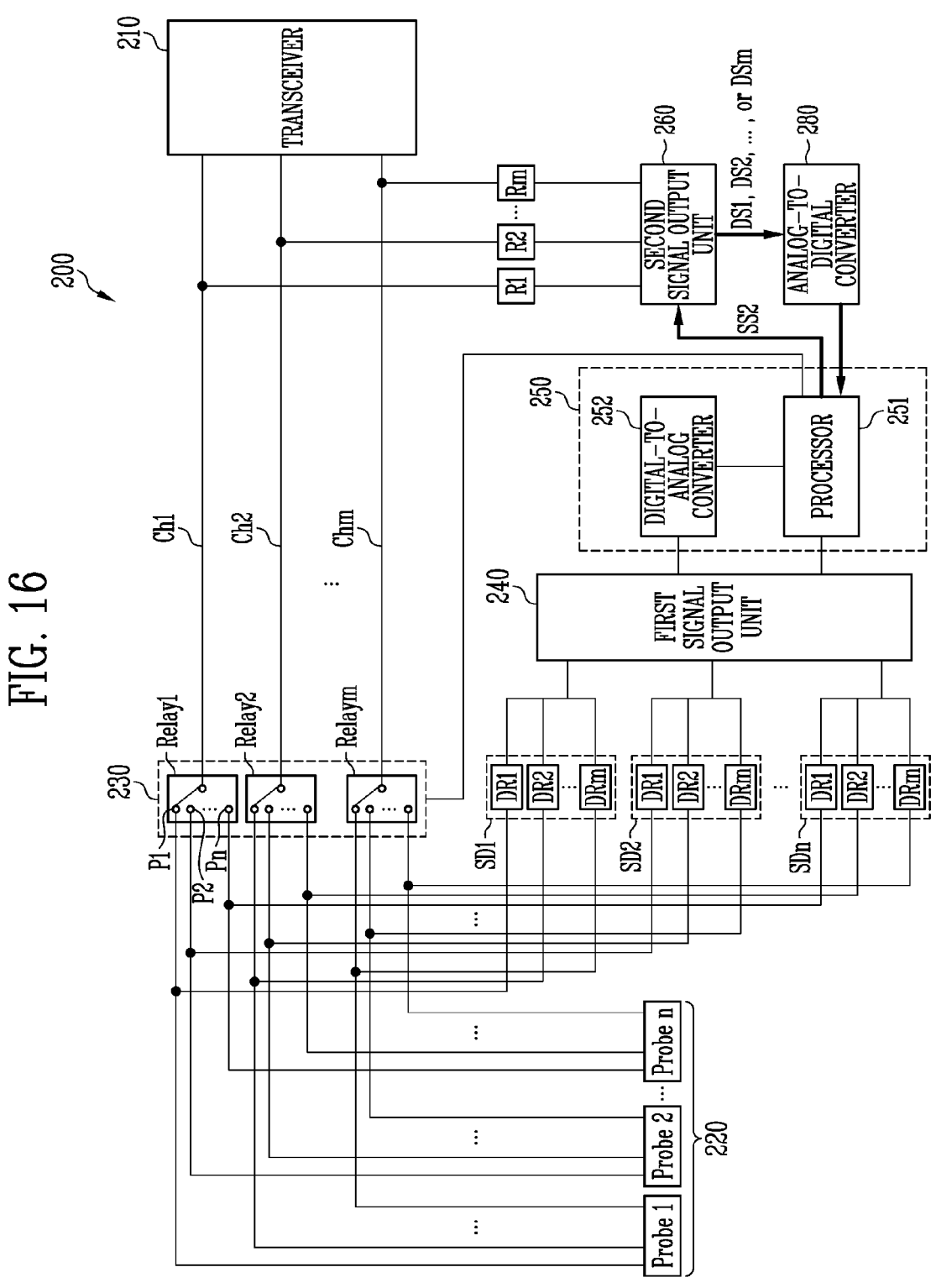

Next, referring to FIG. 16, the processor 251 may generate a second selection signal SS2 and deliver to the second signal output unit 260. The second selection signal SS2 may be a signal in digital form that determines a signal output from the second signal output unit 260.

The second signal output unit 260 may output one distribution signal among the distribution signals DS1, DS2, . . . , DSm to the analog-to-digital converter 280 based on the second selection signal SS2. To this end, the second signal output unit 260 may include a switch digitally controlled to be connected to any one channel among the channels Ch1, Ch2, . . . , Chm through which the distribution signals DS1, DS2, . . . , DSm are delivered. In other words, the second signal output unit 260 may selectively output distribution signals DS1, DS2, . . . , DSm based on the second selection signal SS2 in digital form delivered from the processor 251 so that each of the target ports may be inspected for connection.

The analog-to-digital converter 280 may convert the distribution signals DS1, DS2, . . . , DSm delivered from the second signal output unit 260 from digital form to analog form and deliver to the processor 251. In other words, the analog-to-digital converter 280 may digital-to-analog convert each of the distribution signals DS1, DS2, . . . , DSm and deliver to the processor 251.

The processor 251 may detect whether the relay unit 230 is connected based on the distribution signals DS1, DS2, . . . , DSm delivered from the analog-to-digital converter 280. Alternatively, the processor 251 may detect whether the target ports are connected based on the distribution signals DS1, DS2, . . . , DSm delivered from the analog-to-digital converter 280. For example, the processor 251 may detect whether the first port P1 of the first relay Relay1 is connected based on the first distribution signal DS1, detect whether the first port P1 of the second relay Relay2 is connected based on the second distribution signal DS2, and detect whether the first port P1 of the m-th relay Relaym is connected based on the m-th distribution signal DSm.

As such, according to the self-inspection method of the ultrasound device according to an embodiment of the present disclosure, it is possible to inspect for abnormality (or, connection state) of the relay unit 230, by detecting whether the ports P1, P2, . . . , Pn of the relays Relay1, Relay2, . . . , Relaym are connected without a separate inspection device.

FIGS. 17 to 20 are diagrams illustrating a self-inspection method of an ultrasound device in accordance with an embodiment of the present disclosure. With respect to FIGS. 17 to 20, it is assumed that the operation of the first signal output unit 240 and the controller 250 according to FIGS. 12 and 13 are equally preceded.

Figure 17:
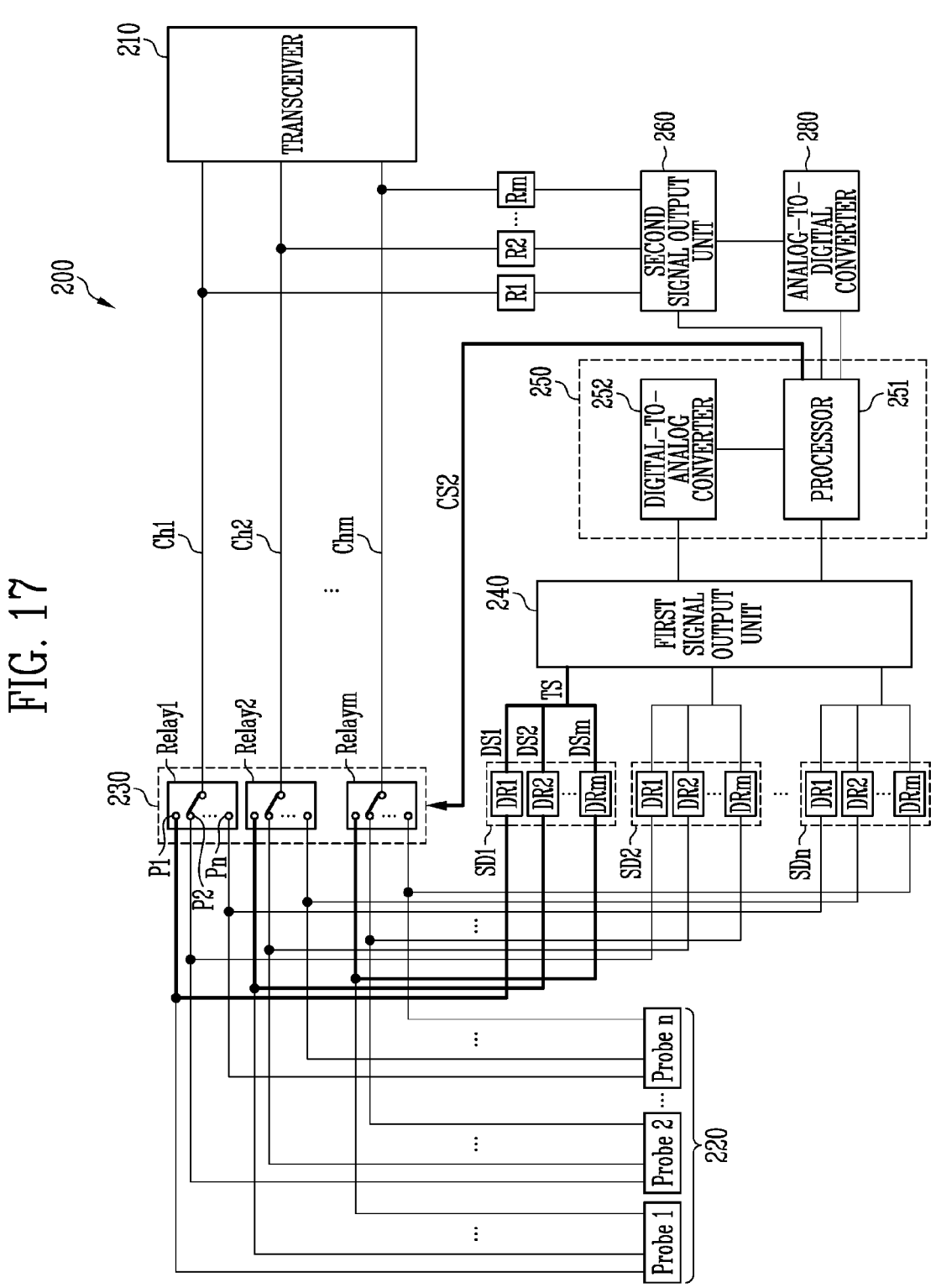
FIGS. 17, 18, 19 and 20 are diagrams illustrating a self-inspection method of an ultrasound device in accordance with an embodiment of the present disclosure.

Referring to FIG. 17, the processor 251 may generate a second control signal CS2 in digital form and deliver to the relay unit 230.

The second control signal CS2 may be a signal for inspecting for leakage of the relay unit 230. Alternatively, the second control signal CS2 may be a signal for inspecting for leakage of the target ports of the relay unit 230 leak. The second control signal CS2 may be generated in response to a user's input through wire or a remote signal through wireless.

The relay unit 230 may not connect the target ports with the channels Ch1, Ch2, . . . , Chm based on the second control signal CS2. In other words, the relay unit 230 may connect ports different from the target ports to the channels Ch1, Ch2, . . . , Chm based on the second control signal CS2. For example, the relay unit 230 may connect each of the second ports P2 different from the first ports P1 which are target ports, and each of the channels Ch1, Ch2, . . . , Chm based on the second control signal CS2. In addition, the relay unit 230 may connect each of the n-th ports Pn different from the first ports P1 which are target ports, and each of the channels Ch1, Ch2, . . . , Chm based on the second control signal CS2.

Figure 18:
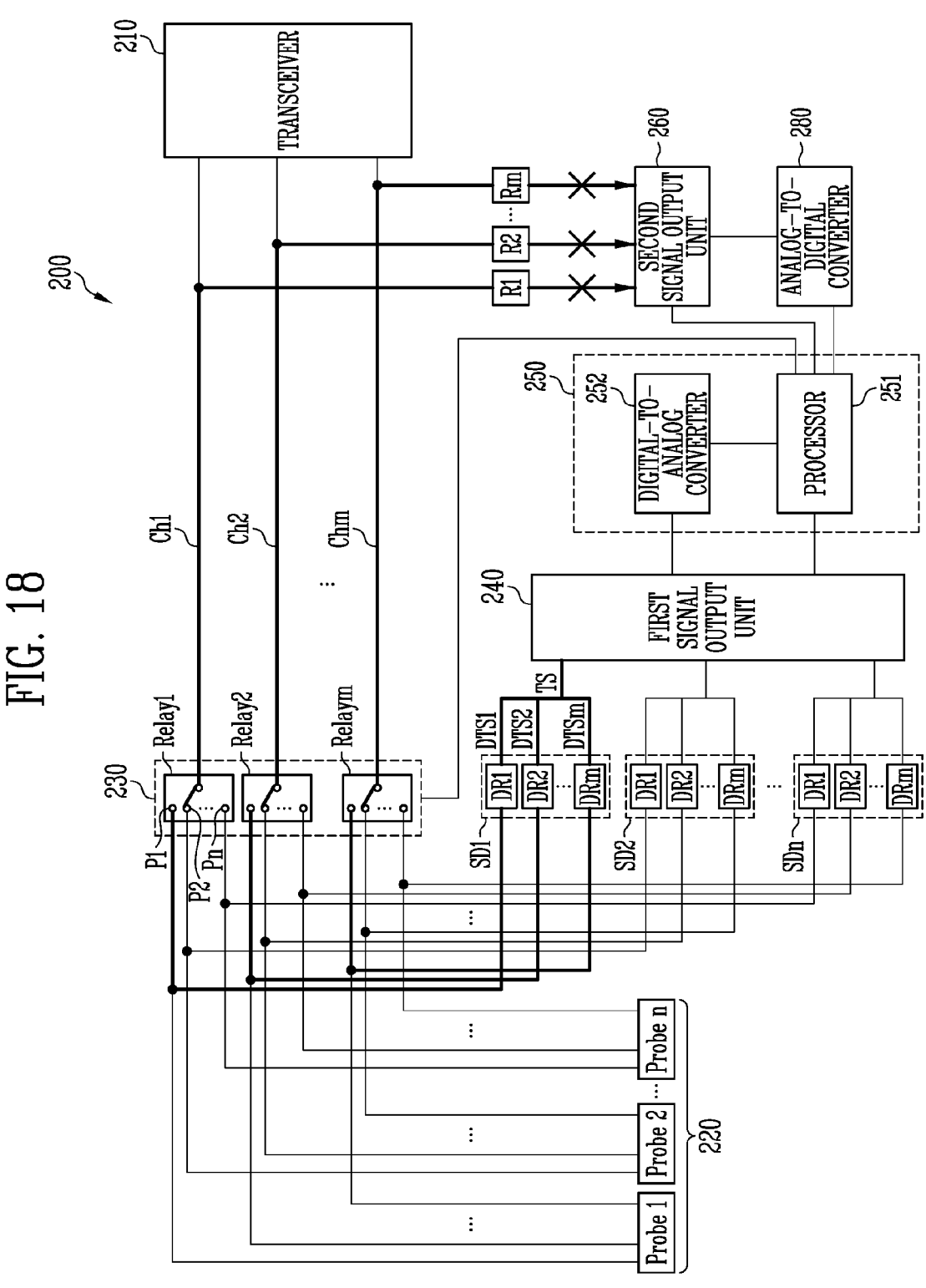

Referring to FIG. 18, when leakage does not occur in the relay unit 230, the second signal output unit 260 may not receive a leakage signal (or leakage current), and accordingly, the leakage signal may not be delivered to the processor 251 as well. Accordingly, the processor 251 may determine that the first ports P1 which are target ports are normal. As such, the processor 251 may determine that there is no abnormality in the relay unit 230 when leakage does not occur in the target ports.

Figure 19:
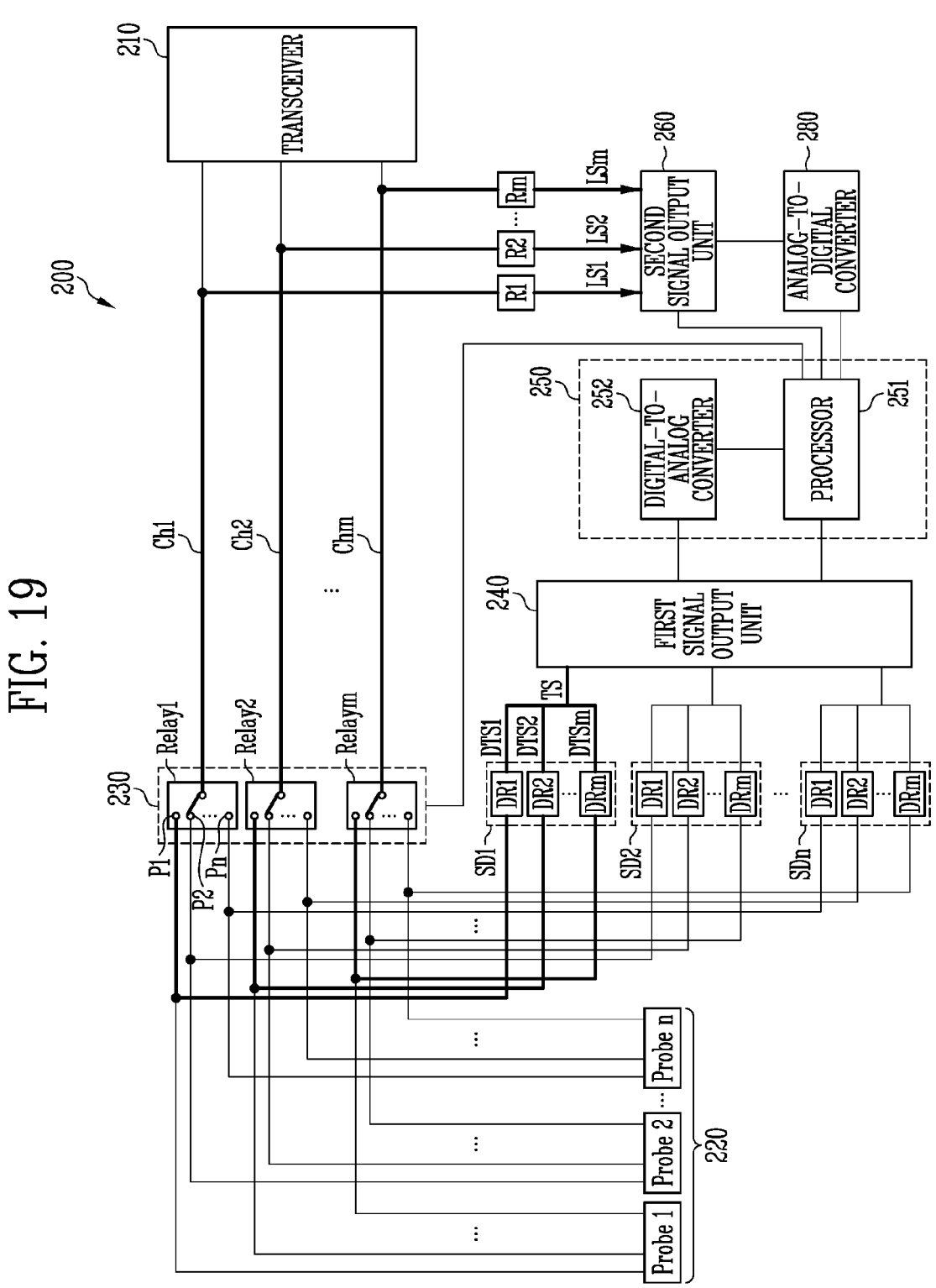

On the other hand, referring to FIG. 19, when leakage occurs in the relay unit 230, the second signal output unit 260 may receive leakage signals leaked from the target ports. For example, the second signal output unit 260 may receive a first leakage signal LS1 leaked from the first port P1 of the first relay Relay1, receive a second leakage signal LS2 leaked from the first port P1 of the second relay Relay2, and receive an m-th leakage signal LSm leaked from the first port P1 of the m-th relay Relaym. Alternatively, the second signal output unit 260 may receive leakage signals leaked from some target ports.

Figure 20:
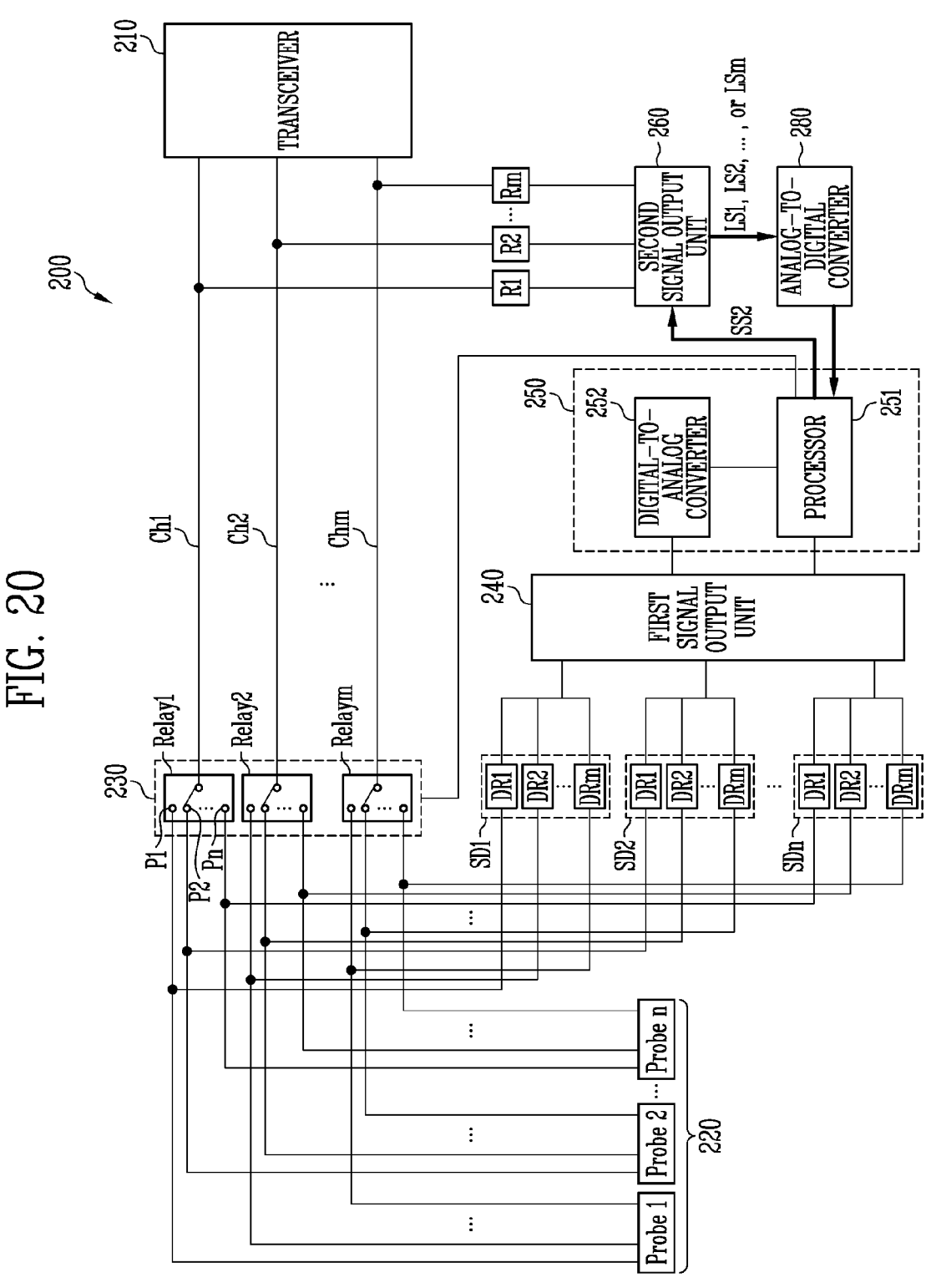

Next, referring to FIG. 20, the processor 251 may generate a second selection signal SS2 in digital form and deliver to the second signal output unit 260. The second signal output unit 260 may output one leakage signal among the leakage signals LS1, LS2, . . . , LSm to the analog-to-digital converter 280 based on the second selection signal SS2 in digital form delivered from the processor 251. In other words, the second signal output unit 260 may selectively output leakage signals LS1, LS2, . . . , LSm based on the second selection signal SS2 in digital form so that each of the target ports may be inspected for leakage.

The analog-to-digital converter 280 may convert the leakage signals LS1, LS2, . . . , LSm delivered from the second signal output unit 260 from the digital form to the analog form and deliver to the processor 251. In other words, the analog-to-digital converter 280 may digital-to-analog convert each of the leakage signals LS1, LS2, . . . , LSm and deliver to the processor 251.

The processor 251 may detect leakage of the relay unit 230 based on the leakage signals LS1, LS2, . . . , LSm delivered from the analog-to-digital converter 280. Alternatively, the processor 251 may detect leakage of target ports based on leakage signals LS1, LS2, . . . , LSm delivered from the analog-to-digital converter 280. For example, the processor 251 may detect leakage of the first port P1 of the first relay Relay1 based on the first leakage signal LS1, detect leakage of the first port P1 of the second relay Relay2 based on the second leakage signal LS2, and detect leakage of the first port P1 of the m-th relay Relaym based on the m-th leakage signal LSm.

As such, according to a self-inspection method of an ultrasound device according to an embodiment of the present disclosure, by detecting leakage of the ports P1, P2, . . . , Pn of the relays Relay1, Relay2, . . . , Relaym without a separate inspection device, it is possible to inspect for abnormality (or leakage state) of the relay unit 230.

While the present disclosure has been specifically described with reference to the above-described embodiments, it should be noted that the embodiments are for illustrating the present disclosure and are not intended to limit the scope of the present disclosure. It will be understood by those skilled in the art to which the present disclosure pertains that various modifications can be made within the scope of the technical spirit of the present disclosure.

The scope of the present disclosure is not limited to the contents described in the detailed description of the specification, but should be defined by the claims. In addition, it should be construed that all changes or modifications derived from the meaning and scope of the claims and their equivalent concept are included in the scope of the present disclosure.

What is claimed is:

1. An ultrasound device, comprising:

a plurality of ultrasonic probes, wherein each of the plurality of ultrasound probes comprises transducers;

a transceiver configured to deliver transmission signals to the plurality of ultrasonic probes and receive reception signals from the plurality of ultrasonic probes;

channels configured to deliver the transmission signals and the reception signals;

a controller configured to generate a test input signal, a control signal and a selection signal;

a relay unit configured to select a target ultrasonic probe connected to the channels among the plurality of ultrasonic probes based on the control signal; and a signal output unit configured to select a target channel among the channels based on the selection signal and output the test input signal to the target channel.

2. The ultrasound device of claim 1, further comprising: resistance elements connected between the signal output unit and the channels.

3. The ultrasound device of claim 1, further comprising:

an analog-to-digital converter configured to analog-to-digital convert a test output signal generated by reflection of the test input signal from the target ultrasonic probe.

4. The ultrasound device of claim 3, wherein the controller is configured to calculate a capacitance of the target ultrasonic probe based on the test output signal, and detect whether the target channel is defective based on the calculated capacitance.

5. An ultrasound device, comprising:

a transceiver connected to channels configured to deliver transmission signals and reception signals;

a controller configured to generate a test signal, a control signal, and a first selection signal;

a relay unit comprising ports, and configured to connect some of the ports and the channels based on the control signal;

signal distributors connected to the ports, respectively, and configured to distribute the test signal into distribution signals; and a first signal output unit configured to select one signal distributor among the signal distributors based on the first selection signal, and output the test signal to the one signal distributor, wherein the distribution signals are delivered to target ports connected to the one signal distributor.

6. The ultrasound device of claim 5, wherein the signal distributors comprise a number of distribution resistance elements obtained by multiplying the number of the ports by the number of the channels.

7. The ultrasound device of claim 5, wherein, when the control signal is a first control signal, the relay unit connects the target ports and the channels based on the first control signal.

8. The ultrasound device of claim 7, wherein the controller is configured to further generate a second selection signal, the ultrasound device further comprises:

a second signal output unit configured to selectively output the distribution signals based on the second selection signal; and an analog-to-digital converter configured to analog-to-digital convert the selectively output distribution signals, and the controller is configured to inspect connection states of the target ports based on the distribution signals.

9. The ultrasound device of claim 5, wherein, when the control signal is a second control signal, the relay unit connects the channels with ports different from the target ports among the ports based on the second control signal.

10. The ultrasound device of claim 9, wherein the controller is configured to further generate a second selection signal, the ultrasound device further comprises:

a second signal output unit configured to selectively output leakage signals generated from the target ports based on the second selection signal; and an analog-to-digital converter configured to analog-to-digital convert the selectively output leakage signals, and the controller is configured to inspect leakage states of the target ports based on the leakage signals.

11. A self-inspection method of an ultrasound device, the self-inspection method comprising:

selecting a target ultrasonic probe connected to channels configured to deliver transmission signals and reception signals among a plurality of ultrasonic probes based on a control signal, wherein each of the plurality of ultrasonic probes comprises transducers;

selecting a target channel among the channels based on a selection signal;

outputting a test input signal to the target channel;

analog-to-digital converting a test output signal generated by reflection of the test input signal from the target ultrasonic probe; and calculating a capacitance of the target ultrasonic probe based on the test output signal.

12. The self-inspection method of claim 11, further comprising:

detecting whether the target channel is defective based on the calculated capacitance.

13. The self-inspection method of claim 12, wherein the detecting comprises comparing the capacitance with an initial capacitance of the target ultrasonic probe.

14. A self-inspection method of an ultrasound device, comprising:

delivering distribution signals into which a test signal is distributed to target ports among ports included in relays based on a first selection signal;

connecting channels configured to deliver transmission signals and reception signals with the target ports based on a control signal;

selectively outputting the distribution signals based on a second selection signal;

analog-to-digital converting the selectively output distribution signals; and inspecting connection states of the target ports based on the distribution signals.

15. A self-inspection method of an ultrasound device, comprising:

delivering distribution signals into which a test signal is distributed to target ports among ports included in relays based on a first selection signal;

connecting channels configured to deliver transmission signals and reception signals with ports different from the target ports among the ports based on a control signal;

selectively outputting leakage signals generated from the target ports based on a second selection signal;

analog-to-digital converting the selectively output leakage signals; and inspecting leakage states of the target ports based on the leakage signals.

\* \* \* \* \*